US011857969B2

(12) United States Patent
Jebrail et al.

(10) Patent No.: US 11,857,969 B2
(45) Date of Patent: *Jan. 2, 2024

(54) DIGITAL MICROFLUIDICS SYSTEMS AND METHODS WITH INTEGRATED PLASMA COLLECTION DEVICE

(71) Applicant: mirOculus Inc., San Francisco, CA (US)

(72) Inventors: Mais J. Jebrail, Toronto (CA); Jorge Abraham Soto Moreno, San Francisco, CA (US); Victor Lee, Richmond Hill (CA)

(73) Assignee: mirOculus Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/888,461

(22) Filed: Aug. 15, 2022

(65) Prior Publication Data

US 2023/0049633 A1 Feb. 16, 2023

Related U.S. Application Data

(63) Continuation of application No. 16/614,396, filed as application No. PCT/US2018/043293 on Jul. 23, 2018, now Pat. No. 11,413,617.

(60) Provisional application No. 62/536,419, filed on Jul. 24, 2017.

(51) Int. Cl.
*B01L 3/00* (2006.01)

(52) U.S. Cl.
CPC . *B01L 3/502792* (2013.01); *B01L 2200/0673* (2013.01); *B01L 2300/166* (2013.01); *B01L 2400/0427* (2013.01)

(58) Field of Classification Search
None
See application file for complete search history.

(56) References Cited

U.S. PATENT DOCUMENTS 4,469,863 A 9/1984 Ts'o et al.
4,569,575 A 2/1986 Le Pesant et al.
4,636,785 A 1/1987 Le Pesant
4,818,052 A 4/1989 Le Pesant et al.
(Continued)

FOREIGN PATENT DOCUMENTS

CA 2470847 A1 7/2003
CA 2740113 A1 4/2010
(Continued)

OTHER PUBLICATIONS

Abdelgawad et al., All-terrain droplet actuation, Lab on a Chip, 8(5), pp. 672-677, May 2008.
(Continued)

*Primary Examiner* — J. Christopher Ball
(74) *Attorney, Agent, or Firm* — Shay Glenn LLP

(57) ABSTRACT

A digital microfluidics (DMF) device can be used to extract plasma from whole blood and manipulate the extracted plasma. The device can have a plasma separation membrane disposed between a sample inlet and sample outlet that leads into the DMF device. Once the plasma contacts the actuation electrodes of the DMF device, the plasma can be actively extracted from the whole blood sample by actuating the actuation electrodes to pull the plasma through plasma separation membrane.

16 Claims, 12 Drawing Sheets

(56) References Cited

U.S. PATENT DOCUMENTS 5,034,506 A 7/1991 Summerton et al.
5,130,238 A 7/1992 Malek et al.
5,216,141 A 6/1993 Benner
5,235,033 A 8/1993 Summerton et al.
5,270,185 A 12/1993 Margolskee
5,386,023 A 1/1995 Sanghvi et al.
5,399,491 A 3/1995 Kacian et al.
5,409,818 A 4/1995 Davey et al.
5,411,876 A 5/1995 Bloch et al.
5,455,166 A 10/1995 Walker
5,486,337 A 1/1996 Ohkawa
5,602,240 A 2/1997 De Mesmaeker et al.
5,637,684 A 6/1997 Cook et al.
5,644,048 A 7/1997 Yau
5,681,702 A 10/1997 Collins et al.
5,705,365 A 1/1998 Ryder et al.
5,710,029 A 1/1998 Ryder et al.
5,888,779 A 3/1999 Kacian et al.
6,007,690 A 12/1999 Nelson et al.
6,074,725 A 6/2000 Kennedy
6,294,063 B1 9/2001 Becker et al.
6,352,838 B1 3/2002 Krulevitch et al.
6,401,552 B1 6/2002 Elkins
6,495,369 B1 12/2002 Kercso et al.
6,565,727 B1 5/2003 Shenderov
6,596,988 B2 7/2003 Corso et al.
6,723,985 B2 4/2004 Schultz et al.
6,773,566 B2 8/2004 Shenderov
6,787,111 B2 9/2004 Roach et al.
6,887,384 B1 5/2005 Frechet et al.
6,911,132 B2 6/2005 Pamula et al.
6,989,234 B2 1/2006 Kolar et al.
7,057,031 B2 6/2006 Olejnik et al.
7,147,763 B2 12/2006 Elrod et al.
7,163,612 B2 1/2007 Sterling et al.
7,214,302 B1 5/2007 Reihs et al.
7,323,345 B1 1/2008 Stjernstrom
7,328,979 B2 2/2008 Decre et al.
7,329,545 B2 2/2008 Pamula et al.
7,349,014 B2 3/2008 Higashihara
7,390,463 B2 6/2008 He et al.
7,391,020 B2 6/2008 Bousse et al.
7,439,014 B1 10/2008 Pamula et al.
7,445,926 B2 11/2008 Mathies et al.
7,531,120 B2 5/2009 Van Rijn et al.
D599,832 S 9/2009 Chapin et al.
7,713,456 B2 5/2010 Dodd et al.
7,727,723 B2 6/2010 Pollack et al.
7,745,207 B2 6/2010 Jovanovich et al.
7,763,471 B2 7/2010 Pamula et al.
7,815,871 B2 10/2010 Pamula et al.
7,822,510 B2 10/2010 Paik et al.
7,851,184 B2 12/2010 Pollack et al.
7,897,737 B2 3/2011 Wu et al.
7,901,947 B2 3/2011 Pollack et al.
7,919,330 B2 4/2011 de Guzman et al.
7,939,021 B2 5/2011 Smith et al.
7,998,436 B2 8/2011 Pollack et al.
8,007,739 B2 8/2011 Pollack et al.
8,041,463 B2 10/2011 Pollack et al.
8,053,239 B2 11/2011 Wheeler et al.
8,088,578 B2 1/2012 Hua et al.
8,093,062 B2 1/2012 Winger
8,137,917 B2 3/2012 Pollack et al.
8,187,864 B2 5/2012 Wheeler et al.
8,190,371 B2 5/2012 Allawi et al.
8,202,686 B2 6/2012 Pamula et al.
8,202,736 B2 6/2012 Mousa et al.
8,208,146 B2 6/2012 Srinivasan et al.
8,268,246 B2 9/2012 Srinivasan et al.
8,304,253 B2 11/2012 Yi et al.
8,317,990 B2 11/2012 Pamula et al.
8,349,276 B2 1/2013 Pamula et al.
8,364,315 B2 1/2013 Sturmer et al.
8,367,370 B2 2/2013 Wheeler et al.
8,389,297 B2 3/2013 Pamula et al.
8,394,641 B2 3/2013 Winger
8,399,222 B2 3/2013 Siva et al.
8,426,213 B2 4/2013 Eckhardt et al.
8,440,392 B2 5/2013 Pamula et al.
8,454,905 B2 6/2013 Pope et al.
8,460,528 B2 6/2013 Pollack et al.
8,470,153 B2 6/2013 Feiglin et al.
8,470,606 B2 6/2013 Srinivasan et al.
8,481,125 B2 7/2013 Yi et al.
8,492,168 B2 7/2013 Srinivasan et al.
8,562,807 B2 10/2013 Srinivasan et al.
8,591,830 B2 11/2013 Sudarsan et al.
8,592,217 B2 11/2013 Eckhardt
8,613,889 B2 12/2013 Pollack et al.
8,637,317 B2 1/2014 Pamula et al.
8,637,324 B2 1/2014 Pollack et al.
8,653,832 B2 2/2014 Hadwen et al.
8,658,111 B2 2/2014 Srinivasan et al.
8,685,344 B2 4/2014 Sudarsan et al.
8,685,754 B2 4/2014 Pollack et al.
8,702,938 B2 4/2014 Srinivasan et al.
8,716,015 B2 5/2014 Pollack et al.
8,809,068 B2 8/2014 Sista et al.
8,821,705 B2 9/2014 Bjornson et al.
8,845,872 B2 9/2014 Pollack et al.
8,846,414 B2 9/2014 Sista et al.
8,852,952 B2 10/2014 Pollack et al.
8,872,527 B2 10/2014 Sturmer et al.
8,877,512 B2 11/2014 Srinivasan et al.
8,888,969 B2 11/2014 Soleymani et al.
8,901,043 B2 12/2014 Eckhardt et al.
8,926,065 B2 1/2015 Winger
8,927,296 B2 1/2015 Sista et al.
8,936,708 B2 1/2015 Feiglin et al.
8,951,732 B2 2/2015 Pollack et al.
8,980,198 B2 3/2015 Srinivasan et al.
9,005,544 B2 4/2015 Van Dam et al.
9,011,662 B2 4/2015 Wang et al.
9,039,973 B2 5/2015 Watson et al.
9,046,514 B2 6/2015 Sista et al.
9,091,649 B2 7/2015 Pollack et al.
9,140,635 B2 9/2015 Graham et al.
9,188,615 B2 11/2015 Sturmer et al.
9,223,317 B2 12/2015 Winger
9,238,222 B2 1/2016 Delattre et al.
9,248,450 B2 2/2016 Bauer
9,377,439 B2 6/2016 Lee et al.
9,435,765 B2 9/2016 Reimitz et al.
9,446,404 B2 9/2016 Bauer et al.
9,476,811 B2 10/2016 Mudrik et al.
9,476,856 B2 10/2016 Pamula et al.
9,513,253 B2 12/2016 Winger
9,517,469 B2 12/2016 Shenderov et al.
9,594,056 B2 3/2017 Fobel et al.
9,851,365 B2 12/2017 Mousa et al.
9,975,117 B2 5/2018 Lee et al.
10,232,374 B2 3/2019 Jebrail et al.
10,464,067 B2 11/2019 Jebrail et al.
10,596,572 B2 3/2020 Hong et al.
11,097,276 B2 8/2021 Jebrail et al.
11,253,860 B2 2/2022 Jebrail et al.
11,298,700 B2 4/2022 Hong et al.
11,311,882 B2 4/2022 Soto-Moreno et al.
11,413,617 B2 8/2022 Jebrail et al.
11,471,888 B2 10/2022 Jebrail et al.
11,524,298 B2 12/2022 Soto-Moreno et al.
11,623,219 B2 4/2023 Jebrail et al.
2002/0150683 A1 10/2002 Troian et al.
2003/0017551 A1 1/2003 Parthasarathy et al.
2003/0136451 A1 7/2003 Beebe et al.
2003/0194716 A1 10/2003 Knoll
2004/0171169 A1 9/2004 Kallury et al.
2004/0211659 A1 10/2004 Velev
2005/0115836 A1 6/2005 Reins
2005/0133370 A1 6/2005 Park et al.
2005/0148091 A1 7/2005 Kitaguchi et al.
2005/0191759 A1 9/2005 Pedersen Bjergaard et al.
2005/0220675 A1 10/2005 Reed et al.

(56) References Cited

U.S. PATENT DOCUMENTS

| | | | | |
|---|---|---|---|---|
| 2006/0091015 | A1 | 5/2006 | Lau | |
| 2006/0132542 | A1 | 6/2006 | Bruker et al. | |
| 2006/0231398 | A1 | 10/2006 | Sarrut et al. | |
| 2006/0272942 | A1 | 12/2006 | Sirringhaus | |
| 2007/0023292 | A1 | 2/2007 | Kim et al. | |
| 2007/0095407 | A1 | 5/2007 | Chen et al. | |
| 2007/0148763 | A1 | 6/2007 | Huh et al. | |
| 2007/0258864 | A1 | 11/2007 | Braymer et al. | |
| 2007/0269825 | A1 | 11/2007 | Wang et al. | |
| 2008/0038810 | A1* | 2/2008 | Pollack .............. | G01N 15/1484 435/283.1 |
| 2008/0110753 | A1 | 5/2008 | Fourrier et al. | |
| 2008/0131904 | A1 | 6/2008 | Parce et al. | |
| 2008/0156983 | A1 | 7/2008 | Fourrier et al. | |
| 2008/0169197 | A1 | 7/2008 | McRuer et al. | |
| 2008/0185339 | A1 | 8/2008 | Delapierre et al. | |
| 2008/0210558 | A1 | 9/2008 | Sauter-Starace et al. | |
| 2008/0241831 | A1 | 10/2008 | Fan et al. | |
| 2008/0293051 | A1 | 11/2008 | Levy et al. | |
| 2009/0017197 | A1 | 1/2009 | Zhang et al. | |
| 2009/0017453 | A1 | 1/2009 | Maples et al. | |
| 2009/0207206 | A1 | 8/2009 | Harada | |
| 2009/0286297 | A1 | 11/2009 | Pihl et al. | |
| 2010/0015614 | A1 | 1/2010 | Beer et al. | |
| 2010/0022414 | A1 | 1/2010 | Link et al. | |
| 2010/0025250 | A1 | 2/2010 | Pamula et al. | |
| 2010/0032293 | A1 | 2/2010 | Pollack et al. | |
| 2010/0048410 | A1 | 2/2010 | Shenderov et al. | |
| 2010/0087012 | A1 | 4/2010 | Shenderov | |
| 2010/0120130 | A1 | 5/2010 | Srinivasan et al. | |
| 2010/0130369 | A1 | 5/2010 | Shenderov et al. | |
| 2010/0136544 | A1 | 6/2010 | Agresti et al. | |
| 2010/0206094 | A1 | 8/2010 | Shenderov | |
| 2010/0236927 | A1 | 9/2010 | Pope et al. | |
| 2010/0236928 | A1 | 9/2010 | Srinivasan et al. | |
| 2010/0236929 | A1 | 9/2010 | Pollack et al. | |
| 2010/0270156 | A1 | 10/2010 | Srinivasan et al. | |
| 2010/0288368 | A1 | 11/2010 | Beebe et al. | |
| 2010/0311599 | A1 | 12/2010 | Wheeler et al. | |
| 2011/0024793 | A1 | 2/2011 | Jeon | |
| 2011/0076685 | A1 | 3/2011 | Moeller et al. | |
| 2011/0097763 | A1 | 4/2011 | Pollack et al. | |
| 2011/0104725 | A1 | 5/2011 | Pamula et al. | |
| 2011/0104747 | A1 | 5/2011 | Pollack et al. | |
| 2011/0107822 | A1 | 5/2011 | Bunner et al. | |
| 2011/0147216 | A1 | 6/2011 | Fan et al. | |
| 2011/0220501 | A1 | 9/2011 | Witkowski et al. | |
| 2011/0240471 | A1 | 10/2011 | Wheeler et al. | |
| 2011/0247934 | A1 | 10/2011 | Wang et al. | |
| 2011/0293851 | A1 | 12/2011 | Bollström et al. | |
| 2011/0303542 | A1 | 12/2011 | Srinivasan et al. | |
| 2011/0311980 | A1 | 12/2011 | Pollack et al. | |
| 2012/0000777 | A1 | 1/2012 | Garrell et al. | |
| 2012/0045748 | A1 | 2/2012 | Willson et al. | |
| 2012/0045768 | A1 | 2/2012 | Arunachalam et al. | |
| 2012/0149018 | A1 | 6/2012 | Dahlberg et al. | |
| 2012/0190027 | A1 | 7/2012 | Loeffert et al. | |
| 2012/0208705 | A1 | 8/2012 | Steemers et al. | |
| 2012/0208724 | A1 | 8/2012 | Steemers et al. | |
| 2012/0259233 | A1 | 10/2012 | Chan et al. | |
| 2012/0261264 | A1 | 10/2012 | Srinivasan | |
| 2012/0289581 | A1 | 11/2012 | Chang et al. | |
| 2012/0325665 | A1 | 12/2012 | Chiou et al. | |
| 2013/0017544 | A1 | 1/2013 | Eckhardt et al. | |
| 2013/0018611 | A1 | 1/2013 | Sturmer | |
| 2013/0062205 | A1 | 3/2013 | Hadwen et al. | |
| 2013/0068622 | A1 | 3/2013 | Schertzer et al. | |
| 2013/0105318 | A1 | 5/2013 | Bhattacharya et al. | |
| 2013/0123979 | A1 | 5/2013 | Elliot et al. | |
| 2013/0157259 | A1 | 6/2013 | Choi et al. | |
| 2013/0168250 | A1 | 7/2013 | Fogleman et al. | |
| 2013/0171546 | A1 | 7/2013 | White et al. | |
| 2013/0177915 | A1 | 7/2013 | Too et al. | |
| 2013/0203606 | A1 | 8/2013 | Pollack et al. | |
| 2013/0215492 | A1 | 8/2013 | Steckl et al. | |
| 2013/0217113 | A1 | 8/2013 | Srinivasan et al. | |
| 2013/0225450 | A1 | 8/2013 | Pollack et al. | |
| 2013/0236377 | A1 | 9/2013 | Kim et al. | |
| 2013/0270114 | A1 | 10/2013 | Feiglin | |
| 2013/0284956 | A1 | 10/2013 | Kwon | |
| 2013/0288254 | A1 | 10/2013 | Pollack et al. | |
| 2013/0293246 | A1 | 11/2013 | Pollack et al. | |
| 2013/0306480 | A1 | 11/2013 | Chang et al. | |
| 2014/0005066 | A1 | 1/2014 | Boles et al. | |
| 2014/0054174 | A1 | 2/2014 | Wang | |
| 2014/0124037 | A1 | 5/2014 | Foley | |
| 2014/0141409 | A1 | 5/2014 | Foley et al. | |
| 2014/0161686 | A1 | 6/2014 | Bort et al. | |
| 2014/0174926 | A1 | 6/2014 | Bort et al. | |
| 2014/0179539 | A1 | 6/2014 | Lohman et al. | |
| 2014/0194305 | A1 | 7/2014 | Kayyem et al. | |
| 2014/0216559 | A1 | 8/2014 | Foley | |
| 2014/0273100 | A1 | 9/2014 | Saito et al. | |
| 2014/0335069 | A1 | 11/2014 | Graham et al. | |
| 2014/0353157 | A1 | 12/2014 | Hoffmeyer et al. | |
| 2015/0001078 | A1 | 1/2015 | Feiglin | |
| 2015/0008123 | A1 | 1/2015 | Cheng et al. | |
| 2015/0021182 | A1 | 1/2015 | Rival et al. | |
| 2015/0075986 | A1 | 3/2015 | Cyril et al. | |
| 2015/0111237 | A1 | 4/2015 | Graham et al. | |
| 2015/0144489 | A1 | 5/2015 | Hoffmeyer et al. | |
| 2015/0148549 | A1 | 5/2015 | Van dam et al. | |
| 2015/0198604 | A1 | 6/2015 | Ermantraut et al. | |
| 2015/0205272 | A1 | 7/2015 | Yi et al. | |
| 2015/0212043 | A1 | 7/2015 | Pollack | |
| 2015/0238959 | A1 | 8/2015 | Prakash et al. | |
| 2015/0258520 | A1 | 9/2015 | Griffiths et al. | |
| 2015/0267242 | A1 | 9/2015 | Foegeding et al. | |
| 2015/0322272 | A1 | 11/2015 | Pokroy et al. | |
| 2016/0068901 | A1 | 3/2016 | Eckhardt et al. | |
| 2016/0108432 | A1 | 4/2016 | Punnamaraju et al. | |
| 2016/0116438 | A1 | 4/2016 | Pamula et al. | |
| 2016/0129437 | A1 | 5/2016 | Kayyem et al. | |
| 2016/0161343 | A1 | 6/2016 | Smith et al. | |
| 2016/0175859 | A1 | 6/2016 | Yi et al. | |
| 2016/0199832 | A1 | 7/2016 | Jamshidi et al. | |
| 2016/0298173 | A1 | 10/2016 | Wang et al. | |
| 2016/0319354 | A1 | 11/2016 | Tocigl et al. | |
| 2016/0370317 | A9 | 12/2016 | Sudarsan et al. | |
| 2017/0184546 | A1 | 6/2017 | Fobel et al. | |
| 2017/0315090 | A1 | 11/2017 | Wheeler et al. | |
| 2017/0354973 | A1 | 12/2017 | Sustarich et al. | |
| 2018/0001286 | A1 | 1/2018 | Wu | |
| 2018/0015469 | A1 | 1/2018 | Reiter et al. | |
| 2018/0059056 | A1 | 3/2018 | Taylor et al. | |
| 2018/0095067 | A1 | 4/2018 | Huff et al. | |
| 2018/0099275 | A1 | 4/2018 | Wu et al. | |
| 2018/0120335 | A1 | 5/2018 | Mousa et al. | |
| 2018/0221882 | A1 | 8/2018 | Roberts et al. | |
| 2018/0250672 | A1 | 9/2018 | Jamshidi et al. | |
| 2019/0210026 | A1 | 7/2019 | Jebrail et al. | |
| 2020/0316606 | A1 | 10/2020 | Soto-Moreno et al. | |
| 2021/0069714 | A1 | 3/2021 | Jebrail et al. | |
| 2021/0370304 | A1 | 12/2021 | Jebrail et al. | |
| 2022/0118455 | A1 | 4/2022 | Jebrail et al. | |
| 2022/0161216 | A1 | 5/2022 | Cervantes et al. | |
| 2022/0219172 | A1 | 7/2022 | Soto-Moreno et al. | |
| 2022/0250078 | A1 | 8/2022 | Soto-Moreno et al. | |
| 2022/0395835 | A1 | 12/2022 | Soto-Moreno et al. | |
| 2022/0401957 | A1 | 12/2022 | Jebrail et al. | |

FOREIGN PATENT DOCUMENTS

| | | | |
|---|---|---|---|
| CA | 2881783 | A1 | 2/2014 |
| CN | 1668527 | A | 9/2005 |
| CN | 101609063 | A | 12/2009 |
| CN | 102549804 | A | 7/2012 |
| CN | 102719526 | A | 10/2012 |
| CN | 102740976 | A | 10/2012 |
| CN | 102836653 | A | 12/2012 |
| CN | 103014148 | A | 4/2013 |
| CN | 103170383 | A | 6/2013 |
| CN | 103502386 | A | 1/2014 |
| CN | 103946712 | A | 7/2014 |

(56) References Cited

FOREIGN PATENT DOCUMENTS

| | | | |
|---|---|---|---|
| CN | 104144748 | A | 11/2014 |
| CN | 104321141 | A | 1/2015 |
| CN | 104995261 | A | 10/2015 |
| CN | 105764490 | A | 7/2016 |
| CN | 105849032 | A | 8/2016 |
| CN | 106092865 | A | 11/2016 |
| DE | 19949735 | A1 | 5/2001 |
| EP | 2111554 | B1 | 5/2013 |
| GB | 2533952 | A | 7/2016 |
| JP | 2002321449 | A | 11/2002 |
| JP | 2006220606 | A | 8/2006 |
| JP | 2010500596 | A | 1/2010 |
| JP | 2010098133 | A | 4/2010 |
| JP | 2010515877 | A | 5/2010 |
| JP | 2010180222 | A | 8/2010 |
| JP | 2012525687 | A | 10/2012 |
| JP | 2015529815 | A | 10/2015 |
| WO | WO2000/067907 | A2 | 11/2000 |
| WO | WO2001/025137 | A1 | 4/2001 |
| WO | WO2003/045556 | A2 | 6/2003 |
| WO | WO2004/074169 | A1 | 9/2004 |
| WO | WO2005/068993 | A1 | 7/2005 |
| WO | WO2005/118129 | A1 | 12/2005 |
| WO | WO2006/000828 | A2 | 1/2006 |
| WO | WO2006/102309 | A2 | 9/2006 |
| WO | WO2007/120240 | A2 | 10/2007 |
| WO | WO2007/123908 | A2 | 11/2007 |
| WO | WO2007/130294 | A2 | 11/2007 |
| WO | WO2007/136386 | A2 | 11/2007 |
| WO | WO2008/066828 | A2 | 6/2008 |
| WO | WO2009/026339 | A2 | 2/2009 |
| WO | WO2009/052348 | A2 | 4/2009 |
| WO | WO2009/111723 | A1 | 9/2009 |
| WO | WO2009/111769 | A2 | 9/2009 |
| WO | WO2009/140671 | A2 | 11/2009 |
| WO | WO2010/003188 | A1 | 1/2010 |
| WO | WO2010/006166 | A2 | 1/2010 |
| WO | WO2010/027894 | A2 | 3/2010 |
| WO | WO2010/042637 | A2 | 4/2010 |
| WO | WO2010/069977 | A1 | 6/2010 |
| WO | WO2010/091334 | A2 | 8/2010 |
| WO | WO2010/111265 | A1 | 9/2010 |
| WO | WO2011/002957 | A2 | 1/2011 |
| WO | WO2011/062557 | A1 | 5/2011 |
| WO | WO2012/061832 | A1 | 5/2012 |
| WO | WO2012/172172 | A1 | 12/2012 |
| WO | WO2013/006312 | A2 | 1/2013 |
| WO | WO2013/040562 | A2 | 3/2013 |
| WO | WO2013/090889 | A1 | 6/2013 |
| WO | WO2013/096839 | A1 | 6/2013 |
| WO | WO2013/116039 | A1 | 8/2013 |
| WO | WO2013/176767 | A1 | 11/2013 |
| WO | WO2014/078100 | A1 | 5/2014 |
| WO | WO2014/083622 | A1 | 6/2014 |
| WO | WO2014/100473 | A1 | 6/2014 |
| WO | WO2014/106167 | A1 | 7/2014 |
| WO | WO2014/108185 | A1 | 7/2014 |
| WO | WO2014/183118 | A1 | 11/2014 |
| WO | WO2015/023745 | A1 | 2/2015 |
| WO | WO2015/077737 | A1 | 5/2015 |
| WO | WO2015/172255 | A1 | 11/2015 |
| WO | WO2015/172256 | A1 | 11/2015 |
| WO | WO2016/094589 | A1 | 6/2016 |
| WO | WO2016/128544 | A1 | 8/2016 |
| WO | WO2016/182814 | A2 | 11/2016 |
| WO | WO2016/197013 | A1 | 12/2016 |
| WO | WO2017/094021 | A1 | 6/2017 |
| WO | WO2017/223026 | A1 | 12/2017 |
| WO | WO2018/119253 | A1 | 6/2018 |
| WO | WO2018/126082 | A1 | 7/2018 |
| WO | WO2019/023133 | A1 | 1/2019 |
| WO | WO2019/046860 | A1 | 3/2019 |
| WO | WO2019/075211 | A1 | 4/2019 |
| WO | WO2019/226919 | A1 | 11/2019 |

OTHER PUBLICATIONS

Abdelgawad et al.; Low-cost, rapid-prototyping of digital microfluidics devices, Microfluidics and Nanofluidics, 4, pp. 349-355, Apr. 2008.

Abdelgawad et al.; Rapid prototyping in copper substrates for digital microfluidics, Adv. Mater., 19(1), pp. 133-137; Jan. 2007.

Abdelgawad et al; Hybrid microfluidics: a digital-to-channel interface for in-line sample processing and chemical separations, Lab on a Chip, 9(8), pp. 1046-1051, Apr. 2009.

Abdelgawad; Digital Microfluidics for Integration of Lab-on -a-Chip Devices (Doctoral dissertation); University of Toronto; @2009.

Albrecht et al.; Laboratory testing of gonadal steroids in children; Pediatric Endocrinology Reviews; 5(suppl 1); pp. 599-607; Oct. 2007.

Analog Devices; 24-bit Capicitance-to-Digital converter with temperature sensor, AD7745/AD7746; Analog Devices; Norwood, MA; 26 pages; (the year of publication is sufficiently earlier than the effective U.S. filing date and any foreign priority date so that the particular month of publication is not in issue) 2005.

Analog Devices; Extending the capacitive input range of AD7745/AD7746 Capicitance-to-Digital converter; Analog Devices: Norwood, MA; 5 pages; (the year of publication is sufficiently earlier than the effective U.S. filing date and any foreign priority date so that the particular month of publication is not in issue) 2009.

Ankarberg-Lindren et al.; A purification step prior to commercial sensitive immunoassay is necessary to achieve clinical usefulness when quantifying serum 17 ?- estradiol in prepubertal children. Eur J Endocrinol, 158, pp. 117-124, Jan. 2008.

Armstrong et al.; A study of plasma free amino acid levels. II. Normal values for children and adults, Metabolism, 22(4), pp. 561-569, Apr. 1973.

Asiello et al.; Miniaturized isothermal nucleic acid amplification, a review; Lab Chip: 11(8); pp. 1420-1430; Apr. 2011.

Au et al., Integrated microbioreactor for culture and analysis of bacteria, algae and yeast, Biomedical Microdevices, 13(1), pp. 41-50, Feb. 2011.

Au et al.; A new angle on pluronic additives: Advancing droplets and understanding in digital microfluidics; Langmuir; 27; pp. 8586-8594; Jun. 2011.

Banatvala et al., Rubella, The Lancet, 363(9415), pp. 1127-1137, Apr. 2004.

Banér et al.; Signal amplification of padlock probes by rolling circle replication; Nuc. Acids Res.; 26(22); pp. 5073-5078; Nov. 1998.

Barany; Genetic disease detection and DNA amplification using cloned thermostable ligase; PNAS; 88(1); pp. 189-193; Jan. 1991.

Barbulovic-Nad et al., A microfluidic platform for complete mammalian cell culture, Lab on a Chip, 10(12), pp. 1536-1542; Jun. 2010.

Barbulovic-Nad et al.; Digital microfluidics for cell-based assays, Lab Chip, 8(4), pp. 519-526; Apr. 2008.

Baxendale et al.; Multistep synthesis using modular flow reactors: bestmann-ohira reagent for the formation of alkynes and triazoles; Angewandte Chemie International Edition; 48(22); pp. 4017-4021; May 2009.

Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.

Beaucage et al., The Functionalization of Oligonucleotides Via Phosphoramidite Derivatives, Tetrahedron, 49(10), pp. 1925-1963, Mar. 1993.

Belanger et al.; Omental and subcutaneous adipose tissue steroid levels in obese men. Steroids, 71(8), pp. 674-682, Aug. 2006.

Bergkvist et al., Improved chip design for integrated solid-phase microextraction in on-line proteomic sample preparation, Proteomics, 2(4), pp. 422-429, Apr. 2002.

Bi et al.; Dumbbell probe-mediated cascade isothermal amplification: A novel strategy for label-free detection of microRNAs and its application to real sample assay; Analytica Chimica Acta; 760; pp. 69-74; Jan. 2013.

(56) References Cited

OTHER PUBLICATIONS

Blankenstein et al.; Intratumoral levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Boles et al.;Droplet-Based Pyrosequencing Using Digital Microfluidics; Analytical Chemistry; 83(22); pp. 8439-8447; Oct. 14, 2011.
Bollström et al.; A Multilayer Coated Fiber-Based Substrate Suitable For Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.
Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burstein; Aromatase inhibitor-associated arthralgia syndrome. Breast, 16(3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.
Chace et al.; Use of tandem mass spectrometry for multianalyte screening of dried blood specimens from newborns, Clinical Chemistry, 49(11), pp. 1797-1817, Nov. 2003.
Chace; Mass spectrometry in newborn and metabolic screening: historical perspective and future directions, Journal of Mass Spectrometry, 44(2), pp. 163-170, Feb. 2009.
Chang et al.; Integrated polymerase chain reaction chips utilizing digital microfluidics; Biomedical Microdevices; 8(3); pp. 215-225; Sep. 2006.
Chatterjee et al.; Droplet-based microfluidics with nonaqueous solvents and solutions, Lab Chip, 6(2), pp. 199-206, Feb. 2006.
Chen et al.; Selective Wettability Assisted Nanoliter Sample Generation Via Electrowetting-Based Transportation; Proceedings of the 5th International Conference on Nanochannels, Microchannels and Minichannels (ICNMM); Puebla, Mexico; Paper No. ICNMM2007-30184; pp. 147-153; Jun. 18-20, 2007.
Chen et al.; The chemistrode: a droplet-based microfluidic device for stimulation and recording with high temporal, spatial, and chemical resolution; Proceedings of the National Academy of Sciences; 105(44); pp. 16843-16848; Nov. 2004.
Cheng et al., Paper-Based Elisa, Angewandte Chemie, 49(28), pp. 4771-4774, Jun. 2010.
Cheng et al.; Highly Sensitive Determination of microRNA Using Target-Primed and Branched Rolling-Circle Amplification; Angew. Chem.; 121(18); pp. 3318-3322; Apr. 2009.
Chetrite et al.; Estradiol inhibits the estrone sulfatase activity in normal and cancerous human breast tissues. Journal of Steroid Biochemistry and Molecular Biology, 104(3-5), pp. 289-292, May 2007.
Cho et al.; Creating, transporting, cutting, and merging liquid droplets by electrowetting-based actuation for digital microfluidic circuits, J. MEMS 2003, 12(1), pp. 70-80, Feb. 2003.
Choi et al., Automated digital microfluidic platform for magnetic-particle-based immunoassays with optimization by design of experiments, Anal. Chem., 85(20), pp. 9638-9646; Oct. 2013.
Choi et al., Digital Microfluidics, Annu. Rev. Anal. Chem., 5, pp. 413-440, (Epub) Apr. 2012.
Christiansen; Hormone Replacement Therapy and Osteoporosis; Maturitas, 23, Suppl. pp. S71-S76, May 1996.
Chuang et al.; Direct Handwriting Manipulation of Droplets By Self-Aligned Mirror-EWOO Across a Dielectric Sheet; 19th IEEE International Conf. on Micro Electro Mechanical Systems (MEMS); Instanbul, Turkey; pp. 538-541; Jan. 22-26, 2006.
Cipriano et al.; The cost-effectiveness of expanding newborn screening for up to 21 inherited metabolic disorders using tandem mass spectrometry: results from a decision-analytic model, Value in Health, 10(2), pp. 83-97, Mar.-Apr. 2007.
Cooney et al.; Electrowetting droplet microfluidics on a single planar surface, Microfluid. Nanofluid., 2(5), pp. 435-446; Sep. 2006.
Coregenomics; How do SPRI beads work; 31 pages; retrieved from the internet (http://core-genomics.blogspot.com/2012/04/how-do-spri-beads-work.html); Apr. 28, 2012.
Cottam et al.; Accelerated synthesis of titanium oxide nanostructures using microfluidic chips; Lab on a Chip; 7(2); pp. 167-169; Feb. 2007.
Crabtree et al.; Microchip injection and separation anomalies due to pressure effects, Anal. Chem., 73(17), pp. 4079-4086, Sep. 2001.
Cunningham; Testosterone replacement therapy for late-onset hypogonadism. Nature Clinical Practice Urology, 3(5), pp. 260-267, May 2006.
Cuzick; Chemoprevention of breast cancer. Women's Health, 2(6), pp. 853-861, Nov. 2006.
Dahlin et al.; Poly(dimethylsiloxane)-based microchip for two-dimensional solid—phase extraction-capillary electrophoresis with an integrated electrospray emitter tip, Anal. Chem., 77(16), pp. 5356-5363, Aug. 2005.
Dambrot; Of microchemistry and molecules: Electronic microfluidic device synthesizes biocompatible probes; 4 pages, retrieved from the internet (https://phys.org/news/2012-01-microchemistry-molecules-electronic-microfluidic-device.html): Jan. 26, 2012.
Danton et al.; Porphyrin profiles in blood, urine and faeces by HPLC/electrospray ionization tandem mass spectrometry. Biomedical Chromatography, 20(6-7), pp. 612-621, Jun.-Jul. 2006.
Davoust et al.; Evaporation rate of drop arrays within a digital microfluidic system; Sensors and Actuators B Chemical; 189; pp. 157-164; Dec. 2013.
Davoust et al.; Evaporation Rate of Drop Arrays within a Digital Microsystem; Procedia Engineering; vol. 47; pp. 1-4; Jan. 1, 2012.
De Mesmaeker et al.; Comparison of rigid and flexible backbones in antisense oligonucleotides; Bioorganic & Medicinal Chem. Lett; 4(3); pp. 395-398; Feb. 1994.
Deligeorgiev et al.; Intercalating Cyanine Dyes for Nucleic Acid Detection; Recent Pat Mat Sci; 2(1); pp. 1-26; Jan. 2006.
Dempcy et al., Synthesis of a thymidyl pentamer of deoxyribonucleic guanidine and binding studies with DNA homopolynucleotides, Proc. Natl. Acad. Sci., 92(13), pp. 6097-6101, Jun. 1995.
Deng et al.; Rapid determination of amino acids in neonatal blood samples based on derivatization with isobutyl chloroformate followed by solid-phase microextraction and gas chromatography/mass spectrometry. Rapid Communications in Mass Spectrometry, 18(1), pp. 2558-2564, Nov. 2004.
Denneulin et al.; Infra-red assisted sintering of inkjet printed silver tracks on paper substrates; J Nanopart Res; 13(9); pp. 3815-3823; Sep. 2011.
Dibbelt et al.; Determination of natural and synthetic estrogens by radioimmunoassay: Comparison of direct and extraction methods for quantification of estrone in human serum. Clinical Laboratory, 44(3), 137-143, Mar. 1998.
Dietzen et al.; National academy of clinical biochemistry laboratory medicine practice guidelines: follow-up testing for metabolic dis-

(56) References Cited

OTHER PUBLICATIONS ease identified by expanded newborn screening using tandem mass spectrometry; executive summary, Clinical Chemistry, 55(9), pp. 1615-1626, Sep. 2009.
Diver et al.; Warning on plasma oestradiol measurement. Lancet, 330(8567), p. 1097, Nov. 1987.
Divino Filho et al.; Simultaneous measurements of free amino acid patterns of plasma, muscle and erythrocytes in healthy human subjects, Clinical Nutrition, 16(6), pp. 299-305, Dec. 1997.
Dixon et al.; An inkjet printed, roll-coated digital microfluidic device for inexpensive, miniaturized diagnostic assays; Lab on a Chip; 16(23); pp. 4560-4568; Nov. 2016.
Djerassi; Chemical birth of the pill. American Journal of Obstetrics and Gynecology, 194(1), pp. 290-298, Jan. 2006.
Dobrowolski et al.; DNA microarray technology for neonatal screening, Acta Paediatrica Suppl, 88(432), pp. 61-64, Dec. 1999.
Doebler et al.; Continuous-flow, rapid lysis devices for biodefense nucleic acid diagnostic systems; Journal of the Association for Laboratory Automation; 14(3); pp. 119-125; Jun. 2009.
Dong et al.; Highly sensitive multiple microRNA detection based on flourescence quenching of graphene oxide and isothermal strand-displacement polymerase reaction; Anal Chem; 84; pp. 4587-4593: Apr. 2012.
Dryden et al.; Integrated digital microfluidic platform for voltammetric analysis; Analytical Chemistry; 85(18); pp. 8809-8816; Sep. 2013.
Duffy et al.; Rapid prototyping of microfluidic systems in Poly (dimethylsiloxane), Anal. Chem., 70(23), pp. 4974-4984, Dec. 1998.
Edgar et al.; Capillary electrophoresis separation in the presence of an immiscible boundary for droplet analysis, Anal. Chem., 78(19), pp. 6948-6954 (author manuscript, 15 pgs. ), Oct. 2006.
Egholm et al., PNA hybridizes to complementary oligonucleotides obeying the Watson-Crick hydrogen-bonding rules, Nature, 365(6446), pp. 566-568, Oct. 1993.
Egholm et al., Recognition of guanine and adenine in DNA by cytosine and thymine containing peptide nucleic acids (PNA), J. Am. Chem. Soc., 114(24), pp. 9677-9678; Nov. 1992.
Ehramm; Polycystic ovary syndrome. New England Journal of Medicine; 352(12); pp. 1223-1236; Mar. 2005.
Ekstrom et al., Miniaturized solid-phase extraction and sample preparation for MALDI MS using a microfabricated integrated selective enrichment target, Journal of Proteome Research, 5(5), pp. 1071-1081. May 2006.
Ekstrom et al., Polymeric integrated selective enrichment target (ISET) for solid-phase-based sample preparation in MALDI-TOF MS, Journal of Mass Spectrometry, 42(11), pp. 1445-1452, Nov. 2007.
Ekstrom et al.,On-chip microextraction for proteomic sample preparation of in-gel digests, Proteomics, 2(4), pp. 413-421, Apr. 2002.
El-Ali et al.; Cells on chips; Nature (2006) insight Review; 442(7101); pp. 403-411; Jul. 2006.
Fair; Digital microfluidics: Is a true lab-on-a-chip possible ?; Microfuid. Nanofluid .; 3(3); pp. 245-281; Jun. 2007.
Falk et al.; Measurement of Sex Steroid Hormones in Breast Adipocytes: Methods and Implications; Cancer Epidemiol Biomarkers Prev; 17(8); pp. 1891-1895; Aug. 2008.
Fan et al.; Cross-scale electric manipulations of cells and droplets by frequency-modulated dielectrophoresis and electrowetting; Lab Chip; 8(8); pp. 1325-1331; Aug. 2008.
Fan et al.; Electrically Programmable Surfaces for Configurable Patterning of Cells; Advanced Materials; 20(8); pp. 1418-1423; Apr. 2008.
Fan et al.; Integrated barcode chips for rapid, multiplexed analysis of proteins in microliter quanties of blood; Nature Biotechnology: 26(12); pp. 1373-1378; 15 pages (Author Manuscript); Dec. 2008.
Faure et al.; Improved electrochemical detection of a transthyretin synthetic peptide in the nanomolar range with a two-electrode system integrated in a glass/PDMS microchip; Lab on a Chip; 14(15); pp. 2800-2805. Aug. 2014.
Fobel et al.; DropBot: An open-source digital microfluidic control system with precise control of electrostatic driving force and instantaneous drop velocity measurement; Applied Physics Letters; 102(19); 193513 (5 pgs.); May 2013.
Foote et al., Preconcentration of proteins on microfluidic devices using porous silica membranes, Analytical Chemistry, 77(1), pp. 57-63, Jan. 2005.
Freire et al.; A practical interface for microfluidics and nanoelectrospray mass spectrometry, Electrophoresis, 29(9), pp. 1836-1843, May 2008.
Fridley et al., Controlled release of dry reagents in porous media for tunable temporal and spatial distribution upon rehydration, Lab Chip, 12(21), pp. 4321-4327 (author manuscript, 14 pgs.), Nov. 2012.
Fu et al., Controlled Reagent Transport in Disposable 2D Paper Networks, Lab. Chip, 10(7), pp. 918-920 (author manuscript, 9 pgs. ), Apr. 2010.
Gao et al.; Unusual conformation of a 3'-thioformacetal linkage in a DNA duplex; J. Biomol. NMR; 4(1); pp. 17-34; Jan. 1994.
Gentili et al.; Analysis of free estrogens and their conjugates in sewage and river waters by solid-phase extraction then liquid chromatography-electrospray-tandem mass spectrometry. Chromatographia 56(1), pp. 25-32, Jul. 2002.
Gerasimova et al.; Fluorometric method for phenylalanine microplate assay adapted for phenylketonuria screening, Clinical Chemistry, 35(10), pp. 2112-2115, Oct. 1989.
Gong et al., All-Electronic Droplet Generation On-Chip With Real-Time Feedback Control For EWOD Digital Microfluidics, Lab Chip, 8(6), pp. 898-906 (author manuscript, 20 pgs. ), Jun. 2008.
Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.
Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.
Goto et al.; Colorimetric detection of loop-mediated isothermal amplification reaction by using hydroxy naphthol blue; Biotechniques; 46(3); pp. 167-172; Mar. 2009.
Gottschlich et al.; Integrated microchip-device for the digestion, separation and postcolumn labeling of proteins and peptides, J. Chromatogr. B, 745(1), pp. 243-249, Aug. 2000.
Govindarajan el al., A low cost point-of-care viscous sample preparation device for molecular diagnosis in the developing world; an example of microfluidic origami, Lab Chip, 12(1). pp. 174-181, Jan. 2012.
Green et al.; Neonatal screening by DNA microarray: spots and chips, Nature Reviews Genetics, 6(2), pp. 147-151, Feb. 2005.
Hatch et al., Integrated preconcentration SDS-PAGE of proteins in microchips using photopatterned cross-linked polyacrylamide gels, Analytical Chemistry, 78(14), pp. 4976-4984, Jul. 2006.
He et al. (ed); Food microbiological inspection technology; Chapter 5: Modem food microbiological inspection technology; China Quality Inspection press; pp. 111-113; (English Translation included) Nov. 2013.
Henderson et al.; Estrogens as a cause of human cancer: The Richard and Hinda Rosenthal Foundation award lecture. Cancer Res, 48(2), pp. 246-253, Jan. 1988.
Hennequin et al.; Synthesizing microcapsules with controlled geometrical and mechanical properties with microfluidic double emulsion technology; Langmuir; 25(14); pp. 7857-7861; Jul. 2009.
Herdewijn et al.; 2'-5'-Oligoadenylates (2-5A) as Mediators of Interferon Action. Synthesis and Biological Activity of New 2-5A Analogues. E. De Clerq (ed.) Frontiers in Microbiology, 231-232, Springer, Dordrecht Jan. 1987.
Hertz et al.; Estrogen-progestogen combinations for contraception. Journal of the American Medical Association, 198(9), pp. 1000-1006, Nov. 1966.
Hong et al.; Three-dimensional digital microfluidic manipulation of droplets in oil medium; Scientific Reports; 5 (Article No. 10685); 5 pgs.; Jun. 2015.

(56) References Cited

OTHER PUBLICATIONS

Horn et al.; Oligonucleotides with alternating anionic and cationic phosphoramidate linkages: Synthesis and hybridization of stereo-uniform isomers; Tetrahedron Lett.; 37(6): pp. 743-746: Feb. 1996.
Hou et al.; Microfluidic devices for blood fractionation; Micromachines; 2(3); pp. 319-343; Jul. 20, 2011.
Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.
Ihalainen et al.; Application of paper-supported printed gold electrodes for impedimetric immunosensor development; Biosensors; 3(1); pp. 1-17; Mar. 2013.
Jacobson et al.; High-Speed Separations on a Microchip, Anal. Chem., 66(7), pp. 1114-1118, Apr. 1994.
Jacobson et al.; Precolumn Reactions with Electrophoretic Analysis Integrated on a Microchip, Anal. Chem., 66(23), pp. 4127-4132, Dec. 1994.
Jebrail et al., Combinatorial Synthesis of Peptidomimetics Using Digital Microfluidics, J. Flow Chem., 2(3), pp. 103-107; (online) Aug. 2012.
Jebrail et al., Let's get digital: digitizing chemical biology with microfluidics, Curr. Opin. Chem. Biol., 14(5), 574-581, Oct. 2010.
Jebrail et al., Synchronized synthesis of peptide-based macrocycles by digital microfluidics, Angew. Chem. Int. Ed. Eng., 49(46), pp. 8625-8629, Nov. 2010.
Jebrail et al., World-to-digital-microfluidic interface enabling extraction and purification of RNA from human whole blood, Analytical Chemistry, 86(8), pp. 3856-3862, Apr. 2014.
Jebrail et al.; A Solvent Replenishment Solution for Managing Evaporation of Biochemical Reactions in Air-Matrix Digital Microfluidics Devices, Lab on a Chip, 15(1), pp. 151-158; Jan. 2015.
Jebrail et al.; Digital Microfluidic Method for Protein Extraction by Precipitation; Analytical Chemistry; 81(1); pp. 330-335; Jan. 2009.
Jebrail et al.; Digital Microfluidics for Automated Proteomic Processing, Journal of Visualized Experiments, 33 (e1603), 5 pgs., Nov. 2009.
Jebrail et al.; Digital microfluidics: a versatile tool for applications in chemistry, biology and medicine; Lab Chip; 12 (14); pp. 2452-2463; Jul. 2012.
Jemere et al., An integrated solid-phase extraction system for sub-picomolar detection, Electrophoresis, 23(20), pp. 3537-3544, Oct. 2002.
Jenkins et al., The biosynthesis of carbocyclic nucleosides; Chem. Soc. Rev.; 24(3); pp. 169-176; Jan. 1995.
Jensen et al.; Free-running enzymatic oligonucleotide synthesis for data storage applications; bioRxiv; 1:355719; 7 pages; Jan. 2018.
Jessome et al.; Ion Suppression: A Major Concern in Mass Spectrometry. LC-GC North America, 24(5), pp. 498-510, May 2006.
Jia et al.; Ultrasensitive detection of microRNAs by exponential isothermal amplification; Angew. Chem. Int. Ed. Engl.; 49(32); pp. 5498-5501; Jul. 2010.
Jung et al.; Hybridization of Alternating Cationic/Anionic Oligonucleotides to RNA Segments; Nucleosides & Nucleotides; 13(6-7); pp. 1597-1605; Jul. 1994.
Kaaks et al.; Postmenopausal serum androgens, oestrogens and breast cancer risk: The European prospective investigation into cancer and nutrition. Endocrine-Related Cancer, 12(4). pp. 1071-1082. Dec. 2005.
Keng et al., Micro-chemical synthesis of molecular probes on an electronic microfluidic device,PNAS, 109(3), pp. 690-695; Jan. 2012.
Kiedrowski et al., Parabolic Growth of a Self-Replicating Hexadeoxynucleotide Bearing a 3'-5'-Phosphoamidate Linkage; Angew. Chemie Intl. Ed.; 30(4); pp. 423-426; Apr. 1991.
Kim et al.; Automated digital microfluidic sample preparation for next-generation DNA sequencing; JALA; Journal of the Association for Laboratory Automation; 16(6); pp. 405-414; Dec. 2011.
Kim et al., A Microfluidic DNA Library Preparation Platform for Next-Generation Sequencing, PLoS One, 8(7), Article ID: e68988; 9 pgs., Jul. 2013.
Kim et al.; Microfabricated Monolithic Multinozzle Emitters for Nanoelectrospray Mass Spectrometry; Anal Chem; 79(10); pp. 3703-3707; May 2007.
Koster et al.; Drop-based microfluidic devices for encapsulation of single cells; Lab on a Chip; 8(7); pp. 1110-1115; Jul. 2008.
Kralj et al.; Integrated continuous microfluidic liquid-liquid extraction. Lab on a Chip, 7(2), pp. 256-263, Feb. 2007.
Kutter et al., Solid phase extraction on microfluidic devices, Journal of Microcolumn Separations, 12(2), pp. 93-97, Jan. 2000.
Kutter et al., Solvent—Programmed Microchip Open-Channel Electrochromatography, Analytical Chemistry, 70(15), pp. 3291-3297, Aug. 1998.
Labrie et al.; Androgen glucuronides, instead of testosterone, as the new markers of androgenic activity in women. The Journal of Steroid Biochemistry and Molecular Biology, 99(4-5), pp. 182-188, Jun. 2006.
Labrie; Intracrinology. Molecular and Cellular Endocrinology, 78(3), pp. C113-C118, Jul. 1991.
Lamar et al.; Serum sex hormones and breast cancer risk factors in postmenopausal women. Cancer Epidemiol Biomarkers Prev, 12(4), pp. 380-383, Apr. 2003.
Langevin et al., A rapid and unbiased method to produce strand-specific RNA-Seq libraries from small quantities of starting materiaRNA Biol., 10(4), pp. 502-515, (online) Apr. 2013.
Lawyer et al.; High-level expression, purification, and enzymatic characterization of full-length Thermus aquaticus DNA polymerase and a truncated form deficient in 5' to 3' exonuclease activity; Genome Res; 2(4); pp. 275-287; May 1993.
Lawyer et al.; Isolation, characterization, and expression in *Escherichia coli* of the DNA polymerase gene from Thermus aquaticus; J. Biol. Chem.; 264; pp. 6427-6437; Apr. 1989.
Lebrasseur et al.; Two-dimensional electrostatic actuation of droplets using a single electrode panel and development of disposable plastic film card; Sensors and Actuators A; 136(1); pp. 368-386; May 2007.
Lee et al.; Electrowetting and electrowetting-on-dielectric for microscale liquid handling, Sens. Actuators A, 95(2), pp. 259-268, Jan. 2002.
Lee et al.; Removal of bovine serum albumin using solid-phase extraction with in-situ polymerized stationary phase in a microfluidic device; Journal of Chromatography A; 1187(1-2): pp. 11-17; Apr. 2008.
Lee et al.; Surface-Tension-Driven Microactuation Based on Continuous Electrowetting; J. Microelectromechanical Systems; 9(2); pp. 171-180; Jun. 2000.
Leriche et al.; Cleavable linkers in chemical biology; Bioorganic & Medicinal Chemistry; 20(2); pp. 571-582; Jan. 15, 2012.
Letsinger et al., Cationic oligonucleotides, J. Am. Chem. Soc., 110(13), pp. 4470-4471, Jun. 1988.
Letsinger et al., Effects of pendant groups at phosphorus on binding properties of d-ApA analogues, Nucl. Acids Res., 14(8), pp. 3487-3499, Apr. 1986.
Letsinger et al., Phosphoramidate analogs of oligonucleotides, J. Org. Chem., 35(11), pp. 3800-3803, Nov. 1970.
Lettieri et al., A novel microfluidic concept for bioanalysis using freely moving beads trapped in recirculating flows, Lab on a Chip, 3(1), pp. 34-39, Feb. 2003.
Levy et al.; Genetic screening of newborns, Annual Review of Genomics and Human Genetics, 1, pp. 139-177, Sep. 2000.
Li et al., A perspective on paper-based microfluidics: Current status and future trends, Biomicrofluidics, 6(1), pp. 011301 (13 pgs), Mar. 2012.
Li et al., Application of microfluidic devices to proteomics research: identification of trace-level protein digests and affinity capture of target peptides, Molecular & cellular Proteomics, 16(2), pp. 157-168, Feb. 2002.
Li et al., Paper-based microfluidic devices by plasma treatment, Anal. Chem., 80(23), pp. 9131-9134, Nov. 2008.
Li et al.; A Low-Cost and High resolution droplet position detector for an intelligent electrowetting on dielectric device; Journal of Lab. Automation 2015; 20(6): pp. 663-669; Dec. 2015.
Li et al.; One-step ultrasensitive detection of microRNAs with loop-mediated isothermal amplification (LAMP); Chem Commun; 47(9); pp. 2595-2597; Mar. 2011.

(56) References Cited

OTHER PUBLICATIONS

Li et al.; Test structure for characterizing low voltage coplanar EWOD system; IEEE Transaction on Semiconductor Manufacturing: IEEE Service Center; Piscataway, NJ.; 22(1): pp. 88-95; Feb. 4, 2009.
Liana et al.; Recent Advances in Paper-Based Sensors; Sensors; 12(9); pp. 11505-11526; Aug. 2012.
Link et al.; Electric Control of Droplets in Microfluidic Devices; Angew Chem Int Ed Engl; 45(16); pp. 2556-2560; Apr. 2006.
Liu et al., Three-dimensional paper microfluidic devices assembled using the principles of origami, JACS, 133(44), pp. 17564-17566, Nov. 2011.
Liu et al.; Attomolar ultrasensitive microRNA detection by DNA-scaffolded silver-nanocluster probe based on isothermal amplification; Anal Chem; 84(12); pp. 5165-5169; Jun. 2012.
Lizardi et al.; Mutation detection and single-molecule counting using isothermal rolling-circle amplification; Nat. Genet.; 19(3); pp. 225-232; Jul. 1998.
Locascio et al.; Surface chemistry in polymer microfluidic systems; in Lab-on-a-Chip; Elsevier Science; 1st Ed.; pp. 65-82; Oct. 2003.
Loeber; Neonatal screening in Europe; the situation in 2004, Journal of Inherited Metabolic Disease, 30(4), pp. 430-438, Aug. 2007.
Lohman et al.; Efficient DNA ligation in DNA-RNA hybrid helices by Chlorella virus DNA ligase; Nucleic Acids Research; 42(3); pp. 1831-1844; Nov. 2013.
Luk et al.; Pluronic Additives: A Solution to Sticky Problems in Digital Microfluidics, Langmuir, 24(12), pp. 6382-6389, Jun. 2008.
Luk et al.; A digital microfluidic approach to proteomic sample processing; Analytical Chemistry; 81(11); pp. 4524-4530; Jun. 2009.
Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.
Mais et al.; A solvent replenishment solution for managing evaporation of biochemical reactions in air-matrix digital microfluidics devices; Lab on a Chip; 15(1); pp. 151-158; Jan. 2015.
Makamba et al.; Surface modification of poly(dimethylsiloxane) microchannels; Electrophoresis; 24(21); pp. 3607-3619; Nov. 2003.
Malloggi et al.; Electrowetting—A versatile tool for controlling microdrop generation, Eur. Phys. J. E, 26(1), pp. 91-96, May 2008.
Mandl et al.; Newborn screening program practices in the United States: notification, research, and consent, Pediatrics, 109(2), pp. 269-273, Feb. 2002.
Maroney et al.; A Rapid, quantitative assay for direct detection of microRNAs and other small RNAs using splinted ligation; RNA; 13(6); pp. 930R936; Jun. 2007.
Maroney et al.; Direct detection of small RNAs using splinted ligation; Nat. Protocols3(2); pp. 279-287; Jan. 2008.
Marre et al.; Synthesis of micro and nanostructures in microfluidic systems; Chemical Society Reviews; 39(3); pp. 1183-1202; Mar. 2010.
Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.
Martinez et al., Three-dimensional microfluidic devices fabricated in layered paper and tape, PNAS, 105(50), pp. 19606-19611, Dec. 2008.
Martinez et al.; Patterned paper as a platform for inexpensive low-volume portable bioassays, Angewandte Chemie, 46(8), pp. 1318-1320, Feb. 2007.
Martinez-Sanchez et al.; MicroRNA Target Identification—Experimental Approaches; Biology; 2; pp. 189-205; Jan. 2013.
Matern et al.; Reduction of the false-positive rate in newborn screening by implementation of MS/MS-based second-tier tests: the Mayo Clinic experience (2004-2007), Journal of Inherited Metabolic Disease, 30(4), pp. 585-592, Aug. 2007.
Mauney, Thermal Considerations for Surface Mount Layouts, in Texas Instruments Portable Power Supply Design Seminar, 16 pgs., 2006.
Mega; Heterogenous ion-exchange membranes RALEX; 3 pgs.; retrieved Mar. 1, 2016 from the internet: http://www.mega.cz/heterogenous-ion-exchange-membranes-ralex.html.
Meier et al., The photochemistry of stilbenoid compounds and their role in materials technology, Chem. Int. Ed. Engl., 31(11), pp. 1399-1420, Nov. 1992.
Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs. ). Sep. 2008.
Michigan Dept. of Community Health; Specimen collection procedure from Michigan Newbom Screening Program, 37 pgs., (retrieved Feb. 9, 2017 online: http://web.archive.org/web/20100715000000*/http://www.michigan.gov/documents/Bloodco2_60773_7.pdf) Jul. 2009.
Miller et al.; A digital microfluidic approach to homogeneous enzyme assays, Anal. Chem., 80(5), pp. 1614-1619, Mar. 2008.
Millington et al.; Digital Microfluidics: A Future Technology in the Newbom Screening Laboratory?, Seminars in Perinatology, 34(2), pp. 163-169 (Author Manuscript, 14 pgs. ), Apr. 2010.
Millington et al.; Digital Microfluidics: A novel platform for multiplexed detection of LSDs with potential for newborn screening (conference presentation); Oak Ridge Conference; 15 pgs.; 2009.
Millington et al.; Tandem mass spectrometry: a new method for acylcarnitine profiling with potential for neonatal screening for inborn errors of metabolism, Journal of Inherited Metabolic Disease, 13(3), pp. 321y324, May 1990.
Millington et al.; The Analysis of Diagnostic Markers of Genetic Disorders in Human Blood and Urine Using Tandem Mass Spectrometry With Liquid Secondary Ion Mass Spectrometry, International Journal of Mass Spectrometry, 111, pp. 211-228, Dec. 1991.
Miralles et al.; A Review of Heating and Temperature Control in Microfluidic Systems: Techniques and Applications; Diagnostics; 3; pp. 33-67; Jan. 2013.
Mitchell et al.; Circulating microRNAs as stable blood-based markers for cancer detection; Proc Nat Acad Sci; 105(30); pp. 10513-10518; Jul. 2008.
Moon et al.; An integrated digital microfluidic chip for multiplexed proteomic sample preparation and analysis by MALDI-MS. Lab Chip, 6(9), pp. 1213-1219, Sep. 2006.
Moqadam et al.; The Hunting of Targets: Challenge in miRNA Research; Leukemia; 27(1); pp. 16-23; Jan. 2013.
Mousa et al.; Droplet-scale estrogen assays in breast tissue, blood, and serum, Science Translational Medicine, 1(1), 6 pgs., Oct. 2009.
Murran et al.; Capacitance-based droplet position estimator for digital microfluidic devices; Lab Chip; 12(11); pp. 2053-2059; May 2012.
Nakamura et al.; Simple and accurate determination of CYP2D6 gene copy number by a loop-mediated isothermal amplification method and an electrochemical DNA chip; Clinica Chimica Acta; 411(7-8); pp. 568-573; Apr. 2010.
Nelson et al., Incubated protein reduction and digestion on an EWOD digital microfluidic chip for MALDI-MS, Analytical Chemistry, 82(23), pp. 9932-9937, Dec. 2010.
Newborn Screening Ontario, The newbom screening ontario unsatisfactory sample indicator (educational resource), 3 pgs., retrieved online, https://www.newbornscreening.on.ce/en/health-care-providers/submitters/report-cards/nso_unsatisfactory_sample_indicator_jan_2017. (web address was available to applicant(s) at least as of Jan. 2010).
Ng et al., Digital microfluidic magnetic separation for particle-based immunoassays, Anal. Chem., 84(20), 8805-8812, Oct. 2012.
Nge et al.; Advances in microfluidic materials, functions, integration, and applications. Chemical reviews; 113(4); pp. 2550-2583; Apr. 10, 2013.
Nilsson et al.; RNA-templated DNA ligation for transcript analysis; Nucl. Acid Res.; 29(2); pp. 578-581; Jan. 2001.
Njiru; Loop-Mediated Isothermal Amplification Technology: Towards Point of Care Diagnostics; PLoS; 6(6); pp. e1572 (4 pgs.); Jun. 2012.
Notomi et al.; Loop-mediated isothermal amplification of DNA; Nucleic Acid Research; 28(12); p. e63 (7 pgs.); Jun. 2000.

(56) References Cited

OTHER PUBLICATIONS

Okubo et al.; Liquid-liquid extraction for efficient synthesis and separation by utilizing micro spaces. Chemical Engineering Science, 63(16), pp. 4070-4077, Aug. 2008.
Oleschuk et al., Trapping of bead-based reagents within microfluidic systems: On-chip solid-phase extraction and electrochromatography, Analytical Chemistry, 72(3), pp. 585-590, Feb. 2000.
Padilla et al.; Newborn screening in the Asia Pacific region, Journal of Inherited Metabolic Disease, 30(4), pp. 490-506, Aug. 2007.
Palluk et al.; De novo DNA synthesis using polymerase-nucleotide conjugates; Nature biotechnology; 36(7); pp. 645-650; Jun. 18, 2018.
Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.
Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.
Parida et al.: Rapid detection and differentiation of Dengue virus serotypes by a real-time reverse transcription-loop-mediated isothermal amplification assay; J Clinical Microbiology: 43(6); pp. 2895-2903; Jun. 2005.
Pauwels et al., Biological-Activity of New 2-5a Analogs, Chemica Scripta, 26(1), pp. 141-145, Mar. 1986.
Peltonen et al.; Printed electrodes on tailored paper enable electrochemical functionalization of paper; TAPPI Nanotechnology Conference; Espoo, Finland; 20 pgs.; Sep. 2010.
Peterschmitt et al.; Reduction of false negative results in screening of newborns for homocystinuria, New England Journal of Medicine, 341(21), 1572-1576, Nov. 1999.
Petersen et al., On-chip electro membrane extraction, Microfluidics and Nanofluidics, 9(4). pp. 881-888, Oct. 2010.
Pitt et al.; Hormone replacement therapy for osteoporosis. Lancet, 335(8695), p. 978, Apr. 1990.
Pollack et al.; Electrowetting-based actuation of droplets for integrated microfluidics; Lab on a Chip; 2(2); pp. 96-101; May 2002.
Pollack et al.; Electrowetting-based actuation of liquid droplets for microfluidic applications, Appl. Phys. Lett., 77(11), pp. 1725-1726, Sep. 2000.
Provincial Health Services Authority (British Columbia Perinatal Health Program), Perinatal Services BC Neonatal Guideline 9: Newborn Screening, 29 pgs., (retrieved Feb. 9, 2017 online: http://www.perinatalservicesbc.ca/health-professionals/guidelines-standards/newbom) guideline revised: Dec. 2010.
Rahhal et al.; The impact of assay sensitivity in the assessment of diseases and disorders in children. Steroids, 73(13), pp. 1322-1327, Dec. 2008.
Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.
Rashed et al.; Diagnosis of inborn errors of metabolism from blood spots by acylcarnitines and amino acids profiling using automated electrospray tandem mass spectrometry, Pediatric Research, 38(3), 324-331, Sep. 1995.
Rawls, Optimistic About Antisense: Promising clinical results and chemical strategies for further improvements delight antisense drug researchers; Chemical & Engineering News; 75(22); pp. 35-39; Jun. 2, 1997.
Ren et al., Automated on-chip droplet dispensing with volume control by electro-wetting actuation and capacitance metering, Sens. Actuator B Chem., 98(2-3), pp. 319-327, Mar. 2004.
Ren et al.; Design and testing of an interpolating mixing architecture for electrowetting-based droplet-on-chip chemical dilution; 12th International Conference on Transducers, Solid-State Sensors, Actuators and Microsystems: vol. 2; Boston, MA, USA; pp. 619-622: Jun. 8-12, 2003.
Ro et al.; Poly (dimethylsiloxane) microchip for precolumn reaction and micellar electrokinetic chromatography of biogenic amines, Electrophoresis, 23(7-8), pp. 1129-1137, Apr. 2002.
Roman et al.; Fully integrated microfluidic separations systems for biochemical analysis, J. Chromatogr. A, 1168(1-2), pp. 170-188, Oct. 2007.
Roman et al.; Sampling and Electrophoretic Analysis of Segmented Flow Streams in a Microfluidic Device, Anal. Chem., 80(21), pp. 8231-8238 (author manuscript, 19 pgs. ), Nov. 2008.
Sabourin et al.; Interconnection blocks: a method for providing reusable, rapid, multiple, aligned and planar microfluidic interconnections; Journal of Micromechanics and Microengineering; 19(3); 10 pages: doi:10.1088/0960-1317/19/3/035021; Feb. 18, 2009.
Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.
Sahai et al.; Newborn screening, Critical Reviews in Clinical Laboratory Sciences, 46(2), pp. 55-82, (online) Mar. 2009.
Samsi et al.; A Digital Microfluidic Electrochemical Immunoassay; Lab on a Chip; 14(3); pp. 547-554; Feb. 2014.
Sanghvi & Cook (Ed.); Carbohydrate Modifications in Antisense Research; Chapters 2 and 3, American Chemical Society, Washington DC; (207th National Meeting of the American Chemical Society Mar. 13-17, 1994. San Jose, CA): Dec. 1994.
Sanghvi & Cook (Ed.); Carbohydrate Modifications in Antisense Research: Chapters 6 and 7, American Chemical Society, Washington DC: (207th National Meeting of the American Chemical Society Mar. 13-17, 1994. San Jose, CA); Dec. 1994.
Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.
Sasano et al.; From Endocrinology to Intracrinology. Endocr Pathol, 9(1), pp. 9-20, Spring 1998.
Satoh et al.; Electrowetting-based valve for the control of the capillary flow, J. Appl. Phys., 103(3), 034903, Feb. 2008.
Satoh et al.; On-chip microfluidic transport and mixing using electrowetting and incorporation of sensing functions, Anal. Chem., 77(21), pp. 6857-6863, Nov. 2005.
Sawai et al., Synthesis and properties of oligoadenylic acids containing 2?- 5? phosphoramide linkage, Chem. Lett., 13(5), pp. 805-808, May 1984.
Schertzer et al.; Using capacitance measurements in EWOD devices to identify fluid composition and control droplet mixing; Sens. Actuators B; 145(1); pp. 340-347; Mar. 2010.
SCRIVER_Commentary; A Simple Phenylalanine Method For Detecting Phenylketonuria in Large Populations of Newborn Infants by Guthrie et al., Pediatrics, 32(3), 338-343, Sep. 1963.
Shah et al., On-demand droplet loading for automated organic chemistry on digital microfluidics, Lab Chip, 13(14), pp. 2785-2795, Jul. 2013.
Shamsi et al; A digital microfluidic electrochemical immunoassay; Lab on a Chip: 14(3); pp. 547-554; (the year of publication is sufficiently earlier than the effective U.S. filing date and any foreign priority date so that the particular month of publication is not in issue) 2014.
Shih et al., A feedback control system for high-fidelity digital microfluidics, Lab Chip, 11(3), pp. 535-540, Feb. 2011.
Simpson et al.; Estrogen —the Good, the Bad, and the Unexpected. Endocr Rev, 26(3), pp. 322-330; May 2005.
Sinha et al., A Versatile Automated Platform for Micro-scale Cell Stimulation Experiments, J. Vis. Exp., e50597, 8 pgs., Aug. 2013.
Sinton et al.; Electroosmotic velocity profiles in microchannels, Colloids Surf. A, 222(1-3), pp. 273-283, Jul. 2003.
Skendzel, Rubella immunity: Defining the level of protective antibody, Am. J. Clin. Pathol., 106(2), 170-174, Aug. 1996.
Smith et al; Diagnosis and Management of Female Infertility. Journal of the American Medical Association 290(13), pp. 1767-1770, Oct. 2003.
Sooknanan et al., Nucleic Acid Sequence-Based Amplification, Ch. 12; Molecular Methods for Virus Detection (1st Ed.), Academic Press, Inc., pp. 261-285; Jan. 1995.

(56) References Cited

OTHER PUBLICATIONS

Sprinzl et al., Enzymatic incorporation of ATP and CTP analogues into the 3' end of tRNA, Eur. J. Biochem., 81(3), pp. 579-589, Dec. 1977.
Srinivasan et al.; An integrated digital microfluidic lab-on-a-chip for clinical diagnostics on human physiological fluids, Lab Chip, 4(4), pp. 310-315, Aug. 2004.
Stanczyk et al.; Standardization of Steroid Hormone Assays Why, How, and When?, Cancer Epidemiol Biomarkers Prev, 16(9), pp. 1713-1719, Sep. 2007.
Steckl et al.; Flexible Electrowetting and Electrowetting on Flexible Substrates; Proc. SPIE 7956: Advances in Display Technologies; and E-papers and Flexible Displays; 795607 (6 pgs.); Feb. 2011.
Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.
Sun et al.; Rapid and direct microRNA quantification by an enzymatic luminescence assay; (author manuscript; 17 pgs. ) Analytical Biochemistry; 429(1); pp. 11-17; Oct. 2012.
Svoboda et al.; Cation exchange membrane integrated into a microfluidic device; Microelectronic Engineering; 86; pp. 1371-1374; Apr.-Jun. 2009.
Szarewski et al.; Contraception. Current state of the art. British Medical Journal, 302(6787), pp. 1224-1226, May 1991.
Szymczak et al.; Concentration of Sex Steroids in Adipose Tissue after Menopause. Steroids, 63(5-6), pp. 319-321, May/Jun. 1998.
Tachibana et al.; Application of an enzyme chip to the microquantification of L-phenylalanine, Analytical Biochemistry, 359(1), pp. 72-78, Dec. 2006.
Tan et al.; A lab-on-a-chip for detection of nerve agent sarin in blood; Lab Chip; 8(6); pp. 885-891; Jun. 2008.
Tang et al.; Mechano-regulated surface for manipulating liquid droplets; Nature Communications; 10 pages; DOI: 10.1038/ncomms14831; ; Apr. 4, 2017.
Teh et al.; Droplet microfluidics, Lab Chip, 8(2), pp. 198-220, Feb. 2008.
Theberge et al.; Microdroplets in microfluidics: an evolving plarform for discoveries in chemistry and biology; Angewandte Chemie International Edition; 49(34); pp. 5846-5868; Aug. 2010.
Therrell et al.; Newborn screening in North America, Journal of Inherited Metabolic Disease, 30(4), pp. 447-465, Aug. 2007.
Tian et al., Printed two-dimensional micro-zone plates for chemical analysis and ELISA, Lab on a Chip, 11(17), pp. 2869-2875, Sep. 2011.
Tobjörk et al., IR-sintering of ink-jet printed metal-nanoparticles on paper, Thin Solid Films, 520(7), pp. 2949-2955, Jan. 2012.
Tomita et al.; Loop-mediated isothermal amplification (LAMP) of gene sequences and simple visual detection of products; Nature Protocols; 3(5); pp. 877-882; (online) Apr. 2008.
Torkkeli; Droplet microfluidics on a planar surface; VTT Technical Research Centre of Finland; Publications 504; 214 pages (Dissertation); Oct. 2003.
Turgeon et al.; Combined Newborn Screening for Succinylacetone, Amino Acids, and Acylcarnitines in Dried Blood Spots, Clinical Chemistry, 54(4), pp. 657-664, Apr. 2008.
Udenfriend et al.; Fluorescamine: a reagent for assay of amino acids, peptides, proteins, and primary amines in the picomole range, Science, 178(4063), pp. 871-872, Nov. 1972.
Unger et al.; Monolithic microfabricated valves and pumps by multilayer soft lithography, Science, 288(5463), pp. 113-116, Apr. 2000.
Univ. of Maryland—Baltimore Washington Medical Center; Plasma amino acids, 6 pgs., retrieved Feb. 10, 2017 from: http://www.mybwmc.org/library/1/003361, Web address available to applicant(s) at least as of Jan. 2010.
Verkman; Drug Discovery in Academia; Am J Physiol Cell Physiol; 286(3); pp. C465-C474; Feb. 2004.
Walker et al.; A Chemiluminescent DNA Probe Test Based on Strand Displacement Amplification (Chapter 15); Molecular Methods for Virus Detection (1st Ed.), Academic Press, Inc., pp. 329-349; Jan. 1995.
Walker et al.; A passive pumping method for microfluidic devices, Lab Chip, 2(3), pp. 131-134, Aug. 2002.
Wang et al., Paper-based chemiluminescence ELISA: lab-on-paper based on chitosan modified paper device and, Biosens. Bioelectron., 31(1), pp. 212-218, Jan. 2012.
Wang et al., Simple and covalent fabrication of a paper device and its application in sensitive chemiluminescence immunoassay, Analyst, 137(16), pp. 3821-3827. Aug. 2012.
Wang et al.; An integrated microfluidic device for large-scale in situ click chemistry screening. Lab on a Chip: 9(16); 9(16); pp. 2281-2285; 9 pages (Author Manuscript); Aug. 2009.
Wang et al.: Highly sensitive detection of microRNAs based on isothermal exponential amplification-assisted generation of catalytic G-quadruplexDNAzyme; Biosensors and Bioelectronics, 42; pp. 131-135; Apr. 2013.
Washburn et al.; Large-scale analysis of the yeast proteome by multidimensional protein identification technology, Nat. Biotechnol., 19(3), pp. 242-247, Mar. 2001.
Watson et al.; Multilayer hybrid microfluidics: a digital-to-channel interface for sample processing and separations; Anal. Chem.; 82(15); pp. 6680-6686; Aug. 2010.
Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.
Wheeler; Chemistry. Putting electrowetting to work; Science; 322(5901); pp. 539-540; Oct. 2008.
Wlodkowic et al.; Tumors on chips: oncology meets microfluidics; Current opinion in Chemical Biology; 14(5); pp. 556-567; Oct. 2010.
Wu et al.; Design, Simulation and Fabrication of Electrowetting-Based Actuators for Integrated Digital Microfluidics; Proceedings of the 1st IEEE International Conference on Nano/Micro Engineered and Molecular Systems; Zhuhai, China; pp. 1097-1100; Jan. 18-21, 2006.
Wu et al.; Electrophoretic separations on microfluidic chips, J. Chromatogr. A, 1184(1-2), pp. 542-559, Mar. 2008.
Yan et al., A microfluidic origami electrochemiluminescence aptamer-device based on a porous Au-paper electrode and a phenyleneethynylene derivative, Chem. Commun. (Camb), 49(14), pp. 1383-1385, Feb. 2013.
Yan et al., Paper-based electrochemiluminescent 3D immunodevice for lab-on-paper, specific, and sensitive point-of-care testing, Chem.--Eur. J., 18(16), pp. 4938-4945, Apr. 2012.
Yi et al.; Spangler et al., Eds; Channel-to-droplet extractions for on-chip sample preparation, in Proceedings of Solid-State Sensor, Actuator and Microsystems Workshop, pp. 128-131, Jun. 2006.
Yin et al.; One-step, multiplexed fluorescence detection of microRNAs based on duplex-specific nuclease signal amplification; J. American Chem. Soc.; 134(11); pp. 5064-5067; Mar. 2012.
Yoon et al.; Preventing Biomolecular Adsorption in Electrowetting-Based Biofluidic Chips; Anal Chem; 75; pp. 5097-5102; Aug. 2003.
Yoon; Open-Surface Digital Microfluidics; The Open Biotechnology Journal; 2(1); pp. 94-100; Apr. 2008.
Young et al.; Calculation of DEP and EWOD Forces for Application in Digital Microfluidics, J. Fluids Eng., 130(8), p. 081603-1-081603-9, Jul. 2008.
Yu et al., Monolithic porous polymer for on-chip solid-phase extraction and preconcentration prepared by photoinitiated in situ polymerization within a microfluidic device, Analytical Chemistry , 73(21), pp. 5088-5096, Nov. 2001.
Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.
Yu et al.; A plate reader-compatible microchannel array for cell biology assays; Lab Chip; 7(3); pp. 388-391; Mar. 2007.

(56) References Cited

OTHER PUBLICATIONS

Yu et al.; Microfabrication of a digital microfluidic platform integrated with an on-chip electrochemical cell; Journal of Micromechanics and Microrngineering: 23(9); pp. 10 pages; doi: 10.1088/0960-1317/23/9/095025; Aug. 2013.
Yu et al.; Microfabtrication of a digital microfluidic platform integrated with an on-chip electrochemical cell; Journal of Micromechanics and Microengineering; 23(9): doi:10.1088/0960-1317/23/9/095025, 10 pages; Aug. 28, 2013.
Yu et al.; Parallel-plate lab-on-chip electrochemical analysis; Journal of Micromechanics and Microengineering; 24(1); 7 pages; doi: 10.1088/0960-1317/24/1/015020; Dec. 16, 2013.
Yue; Undergraduate Chemistry experiment (11); Hunan Normal University Press; First Edition; p. 96; (Machine Translation included); Oct. 2008.
Yung et al.; Micromagnetic-microfluidic blood cleansing devices; Lab on a Chip; 9(9); pp. 1171-1177; May 2009.
Zaffanello et al.; Multiple positive results during a neonatal screening program: a retrospective analysis of incidence, clinical implications and outcomes, Journal of Perinatal Medicine, 33(3), pp. 246-251, May 2005.
Zhang et al.; Multiplexed detection of microRNAs by tuning DNA-scaffolded silver nanoclusters; Analyst; 138(17); pp. 4812-4817; Sep. 2013.
Zhang et al.; The permeability characteristics of silicone rubber; In Proceedings of 2006 SAMPE Fall Technical Conference; 10 pages; Nov. 6, 2006.
Zhao et al., Lab on Paper, Lab Chip, 8(12), pp. 1988-1991, Dec. 2008.
Znidarsic-Plazl et al.; Steroid extraction in a microchannel system—mathematical modelling and experiments. Lab Chip, 7(7), pp. 883-889, Jul. 2007.
Zuker; Mfold Web Server for Nucleic Acid Folding and Hybridization Prediction; Nucleic Acid Research ; 31(13); pp. 3406-3415; Jul. 2003.
Zytkovicz et al.; Tandem mass spectrometric analysis for amino, organic, and fatty acid disorders in newborn dried blood spots: a two-year summary from the New England Newborn Screening Program, Clinical Chemistry, 47(11), pp. 1945-1955, Nov. 2001.
Jebrail et al.; U.S. Appl. No. 17/967,671 entitled "Evaporation Management in Digital Mecrofluidic Devices," filed Oct. 17, 2022.
Soto-Moreno et al.; U.S. Appl. No. 18/064,893 entitled "Digital microfluidics devices and methods of use thereof," filed Dec. 12, 2022.
Jebrail et al.; U.S. Appl. No. 18/062,007 entitled "Sequencing by synthesis using mechanical compression," filed Dec. 5, 2022.
Jebrail et al.; U.S. Appl. No. 18/062,011 entitled "Methods of mechanical microfluidic manipulation ," filed Dec. 5, 2022.

* cited by examiner

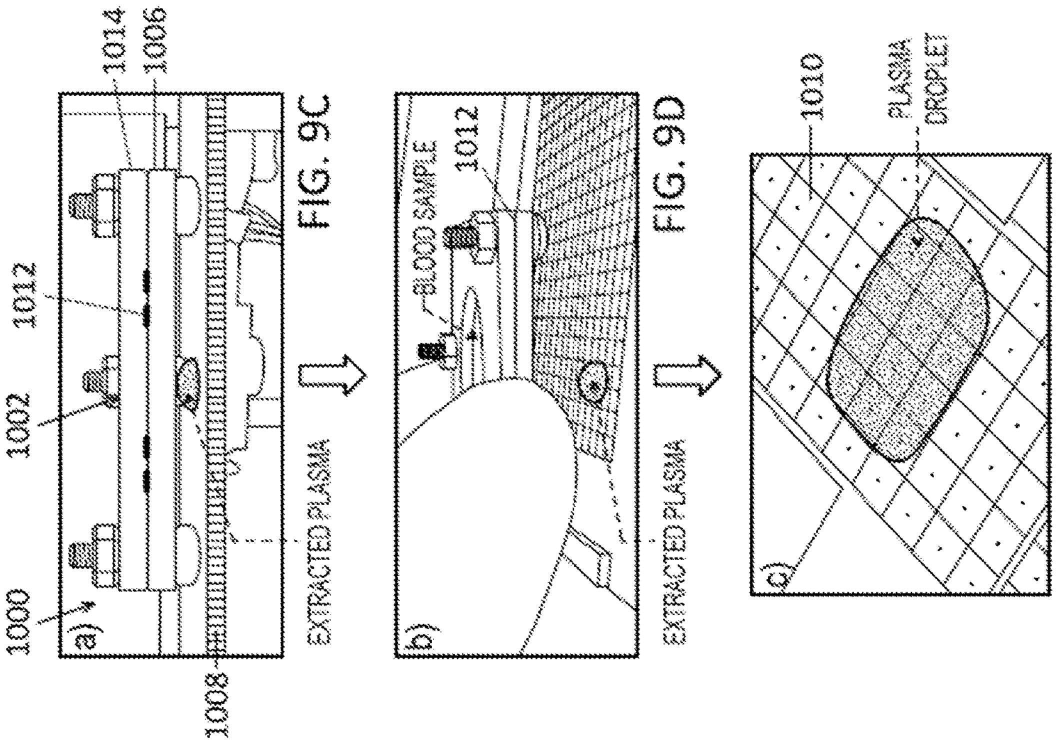
FIG. 9C
FIG. 9D
FIG. 9E
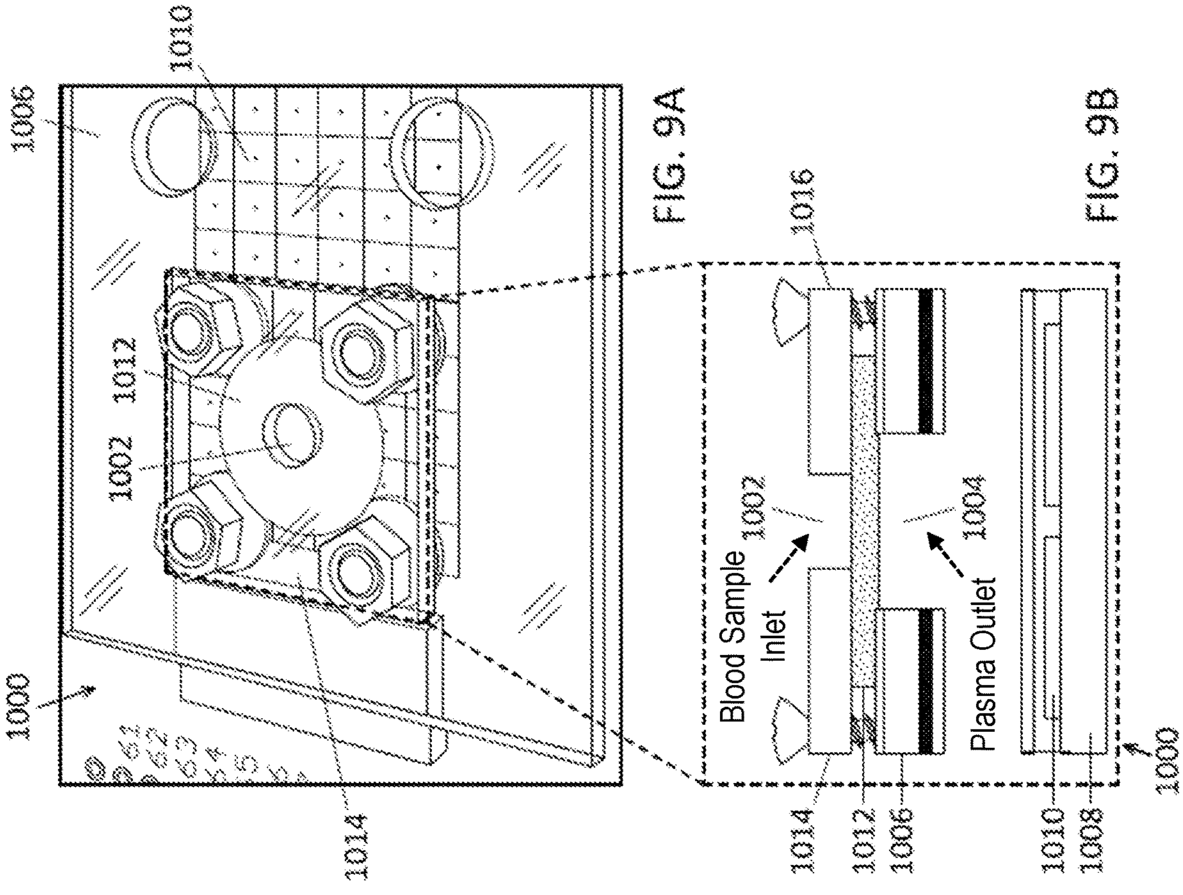
FIG. 9A
FIG. 9B

DIGITAL MICROFLUIDICS SYSTEMS AND METHODS WITH INTEGRATED PLASMA COLLECTION DEVICE

CROSS REFERENCE TO RELATED APPLICATIONS

This application is a continuation of U.S. patent application Ser. No. 16/614,396, filed Nov. 18, 2019, titled "DIGITAL MICROFLUIDICS SYSTEMS AND METHODS WITH INTEGRATED PLASMA COLLECTION DEVICE," now U.S. Pat. No. 11,413,617, which is a national phase application under 35 USC 371 of International Patent Application No. PCT/US2018/043293, filed Jul. 23, 2018, titled "DIGITAL MICROFLUIDICS SYSTEMS AND METHODS WITH INTEGRATED PLASMA COLLECTION DEVICE," which claims priority to U.S. Provisional Patent Application No. 62/536,419, filed Jul. 24, 2017, titled "DIGITAL MICROFLUIDICS SYSTEMS AND METHODS WITH INTEGRATED PLASMA COLLECTION DEVICE," each of which is herein incorporated by reference in its entirety for all purposes.

This patent application may claim priority to International Application No. PCT/US2016/036015, titled "AIR-MATRIX DIGITAL MICROFLUIDICS APPARATUSES AND METHODS FOR LIMITING EVAPORATION AND SURFACE FOULING," filed on Jun. 6, 2016.

INCORPORATION BY REFERENCE

All publications and patent applications mentioned in this specification are herein incorporated by reference to the same extent as if each individual publication or patent application was specifically and individually indicated to be incorporated by reference.

FIELD

Air-matrix digital microfluidic (DMF) apparatuses and methods for manipulating and processing encapsulated droplets are described herein.

BACKGROUND

Microfluidics-based technologies have proven useful in a wide variety of applications. While microfluidic manipulations are typically carried out using microchannels, an alternative paradigm has recently emerged, called digital microfluidics (DMF). In DMF, discrete nanoliter- (nL) to microliter-(μL) sized droplets of fluid are manipulated on a planar hydrophobic surface by applying a series of electrical potentials to an array of electrode pads. DMF has rapidly become popular for chemical, biological, and medical applications, as it allows straightforward control over multiple reagents, facile handling of both solids and liquids, and compatibility with even troublesome reagents (e.g., organic solvents, corrosive chemicals, etc.) because the hydrophobic surface is typically chemically inert.

Although DMF devices can handle different types of liquids, manipulating whole blood can cause a variety of difficulties, such as interfering with colorimetric assays and causing fouling. Further, many micro- and nano-fluidic assays are not capable of handling the often necessarily larger volumes of blood needed as the input to the assay directly. Therefore, it would be desirable to provide a DMF device that can extract plasma from a whole blood sample.

SUMMARY OF THE DISCLOSURE

Described herein air-matrix digital microfluidic (DMF) methods for manipulating and processing blood, as well as apparatuses adapted to process blood.

We have recently developed a module for large-volume (milliliter-scale) sample extraction and concentration into the microliter volume used on the DMF device, utilizing a pre-fabricated cartridge and peristaltic pump to efficiently mix a sample with magnetic capture beads. To date, we have demonstrated microRNA extractions from up to 100 μL of plasma into a 2 μL droplet, with performance (recovery, quality) comparable to that achieved with bench-scale bead-based microRNA extraction. However, a continuing challenge for DMF is extracting plasma from whole blood for a complete sample-in-answer-out solution. In response to this challenge, we developed the first device architecture combining a plasma separation membrane from whole blood samples and downstream processing with DMF (see, e.g., FIG. 1). For many liquid biopsy applications, acquiring cell free plasma is very important to ensure the detection of the cell free fraction of circulating DNA or RNA. This module is meant to not only separate plasma but also to ensure that not even platelets or white blood cells are carried over or lysed during the separation.

For example, described herein are air-matrix digital microfluidic (DMF) apparatuses configured to process whole blood and manipulate plasma extracted from the whole blood. These apparatuses may include: a first plate having a first hydrophobic layer; a second plate having a first side coated with a second hydrophobic layer, the second plate having a sample outlet; an air gap formed between the first and second hydrophobic layers; a plurality of actuation electrodes adjacent to the first hydrophobic layer; a sample inlet positioned over the sample outlet, the sample inlet configured to receive a sample of whole blood; a plasma separation membrane positioned between the sample inlet and the sample outlet, the plasma separation membrane configured to extract plasma into the sample outlet from the whole blood in the sample inlet; and a controller programmed to actuate a subset of the plurality of actuation electrodes that are activated when the plasma extracted from the whole blood contacts the first plate in order to draw the plasma through the plasma separation membrane.

The sample inlet may have a hydrophobic or super-hydrophobic surface. The second plate may have a second side with a super-hydrophobic surface, wherein the plasma separation membrane is positioned between the super-hydrophobic surface of the second plate and the super-hydrophobic surface of the sample inlet. For example, the sample inlet may comprise a cover plate with a hole. The sample inlet may be positioned above the sample outlet such that when the sample of whole blood is placed in the sample inlet, gravity draws the plasma through the plasma separation membrane.

Any appropriate plasma separation membrane may be used. For example, the plasma separation membrane may be porous and has larger pores positioned towards the sample inlet and smaller pores positioned towards the sample outlet. The plasma separation membrane may be an assembly of a plurality of membranes having different pore sizes.

The first plate may be part of a reusable device and the second plate is part of a disposable cartridge. The actuation electrodes may be disposed on a removable film.

The sample outlet may be larger than the sample inlet.

Also described herein are methods of extracting plasma from whole blood in an air-matrix digital microfluidic (DMF) apparatus, the method comprising: introducing a sample of whole blood into a sample inlet of the air-matrix DMF apparatus; extracting plasma from the sample of whole blood in the sample inlet through a plasma separation membrane and into a sample outlet of the air-matrix DMF apparatus; transporting the extracted plasma from the sample outlet to one or more actuation electrodes of a plurality of actuation electrodes of the air-matrix DMF apparatus; and actuating the one or more actuation electrodes of the air-matrix DMF apparatus to actively extract plasma from the sample of whole blood.

The method may also include prewetting the plasma separation membrane before introducing the sample of whole blood into the sample inlet.

As mentioned, the sample inlet may be positioned above the sample outlet such that when the sample of whole blood is introduced into the sample inlet, gravity draws the plasma through the plasma separation membrane. The plasma separation membrane may be sandwiched between a pair of super-hydrophobic surfaces.

The extracted plasma may be transported from the sample outlet to one or more actuation electrodes at least in part by gravity.

The method may also include detecting when the extracted plasma contacts the one or more actuation electrodes. The method may also include actuating the one or more actuation electrodes after the extracted plasma contacts the one or more actuation electrodes.

The method may also include actuating the one or more actuation electrodes before the extracted plasma contacts the one or more actuation electrodes.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 9A-9E illustrate a DMF apparatus with an integrated plasma separation device.

DETAILED DESCRIPTION

Figure 1:
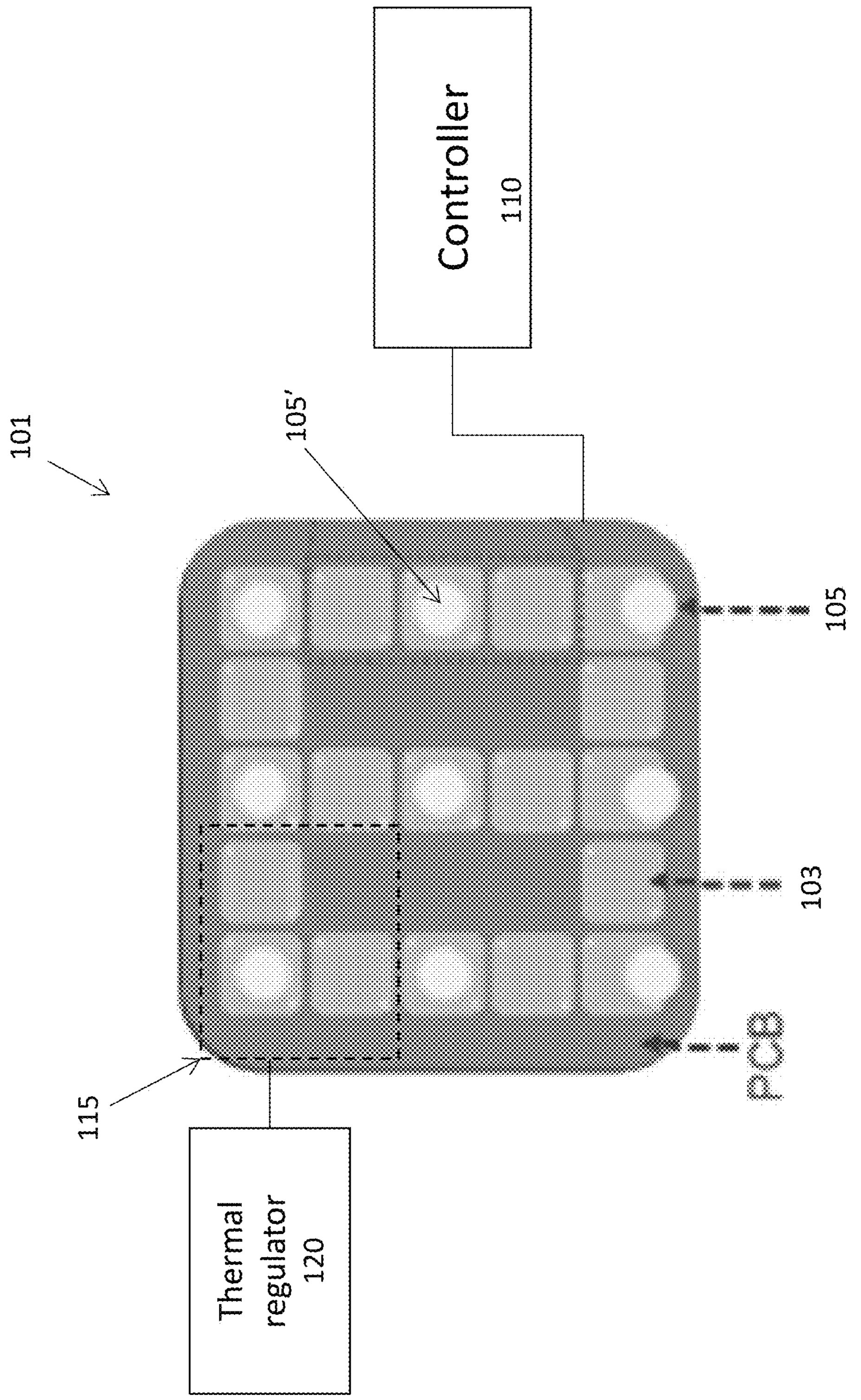
FIG. 1 is a top view of an example of a portion of an air-matrix DMF apparatus, showing a plurality of unit cells (defined by the underlying actuating electrodes) and reaction chamber openings (access holes).

Described herein are air-matrix digital microfluidics (DMF) methods and apparatuses that may be used with a fresh or stored (e.g., frozen) blood same, including blood samples taken directly from a patient. An air-matrix DMF apparatus as described herein may be particularly useful for use with immediately processing blood samples as part of the DMF process.

In particular, described herein are air-matrix DMF apparatuses including a plasma separation membrane as part of the apparatus, including as part of a cartridge that may be applied to a DMF driving apparatus. The plasma separation membrane may be formed as part of the top (e.g., top surface, or top plate) of the DMF apparatus. The apparatus may be configured to enhance the capillary forces drawing plasma through the plasma separation membrane and into the air gap of the DMF apparatus. Without the enhancements described herein, the rate of flow of plasma through a typically membrane (e.g., filter, separation membrane, etc.) would be rate limiting and slow, and would further limit the usefulness of the apparatus for directly processing blood without the need for separation or other pre-treatments.

For example, in any of the apparatuses described herein, a plasma separation membrane may be included on the top plate of the digital microfluidic (DMF) apparatus. The apparatus may be configured to pre-wet the separation membrane and/or a method of using the apparatus may include prewetting the separation membrane, to enhanced capillary forces and achieve faster flow through membrane. The apparatus may be configured so that, upon contact of plasma with DMF surface, the electrode(s) is/are actuated to pull the plasma to the DMF device using electro wetting forces. For example, the apparatus may be configured to detect plasma contacting the one or more electrodes within a plasma loading region of the air gap, for example, by electrical detection (e.g., change of an electrical property of the electrode(s)), optical detection (e.g., an optical sensor aimed at the air gap region at or near the plasma loading region), etc. Once fluid, e.g., plasma, is detected within this region, the DM apparatus may electrically modify the electrowetting forces and move the droplet. Pulling the droplet away by adjusting the electrowetting force may increase the flow of plasma through the membrane and into the air gap.

In any of the apparatuses and methods described herein, the plasma separation membrane may be sandwiched between super hydrophobic surfaces. The loading region on the outward-facing side of the apparatus may be a super-hydrophobic surface (e.g., including super hydrophobic coatings). The super hydrophobic environment surrounding the membrane may prevent a blood sample from overflowing the edges of the separation membrane, and may help achieve a maximum volume flow through membrane.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

In general, an air-matrix DMF apparatus as disclosed herein may have any appropriate shape or size. The air-matrix DMF apparatuses described herein generally include at least one hydrophobic surface and a plurality of activation electrodes adjacent to the surface; either the hydrophobic surface may also be a dielectric material or an additional dielectric material/layer may be positioned between the actuation electrodes and the hydrophobic surface. For example, in some variations, the air-matrix DMF includes a series of layers on a printed circuit board (PCB) forming a first or bottom plate. The outer (top) surface of this plate is the hydrophobic layer. Above this layer is the air gap (air gap region) along which a reaction droplet may be manipulated. In some variations a second plate may be positioned opposite from the first plate, forming the air gap region between the two. The second plate may also include a hydrophobic coating and in some variations may also include a ground electrode or multiple ground electrodes opposite the actuation electrodes. The actuation electrodes may be configured for moving droplets from one region to another within the DMF device, and may be electrically coupled to a controller (e.g., control circuitry) for applying energy to drive movement of the droplets in the air gap. As mentioned, this plate may also include a dielectric layer for increasing the capacitance between the reaction droplet and the actuation electrodes. The reaction starting materials and reagents, as well as additional additive reagents may be in reservoirs that may be dispensed into the air gap, where the reaction mixture is typically held during the reaction. In some instances the starting materials, reagents, and components needed in subsequent steps may be stored in separate areas of the air gap layer such that their proximity from each other prevents them from prematurely mixing with each other. In other instances, the air gap layer may include features that are able to compartmentalize different reaction mixtures such that they may be close in proximity to each other but separated by a physical barrier. In general, the floor of the air gap is in the first plate, and is in electrical contact with a series of actuation electrodes.

In some embodiments, one of the plates can be integrated into a reader device, and the other plate can be integrated into a removable, disposable cartridge, that when attached to the reader, form a two plate digital microfluidics system similar to that described herein. The reader device can be a permanent, reusable device that contains all or a bulk of the electronics for controlling the DMF system, and may optionally also containing sensors (i.e. sensors for measuring color and/or light, temperature or pH) for analyzing the droplets in the device. In addition, the actuation electrodes can be disposed on a film, which can also be made of a dielectric material. The film can be removably attached to one of the plates, such as the plate on the reader or the plate on the cartridge, while the other plate can have the ground electrode(s). For example, U.S. Pat. Nos. 8,187,864; 8,470,153; 8,821,705; 8,993,348; and 9,377,439, which are hereby incorporated by reference in their entireties, describe cartridge based DMF systems.

Figure 10:
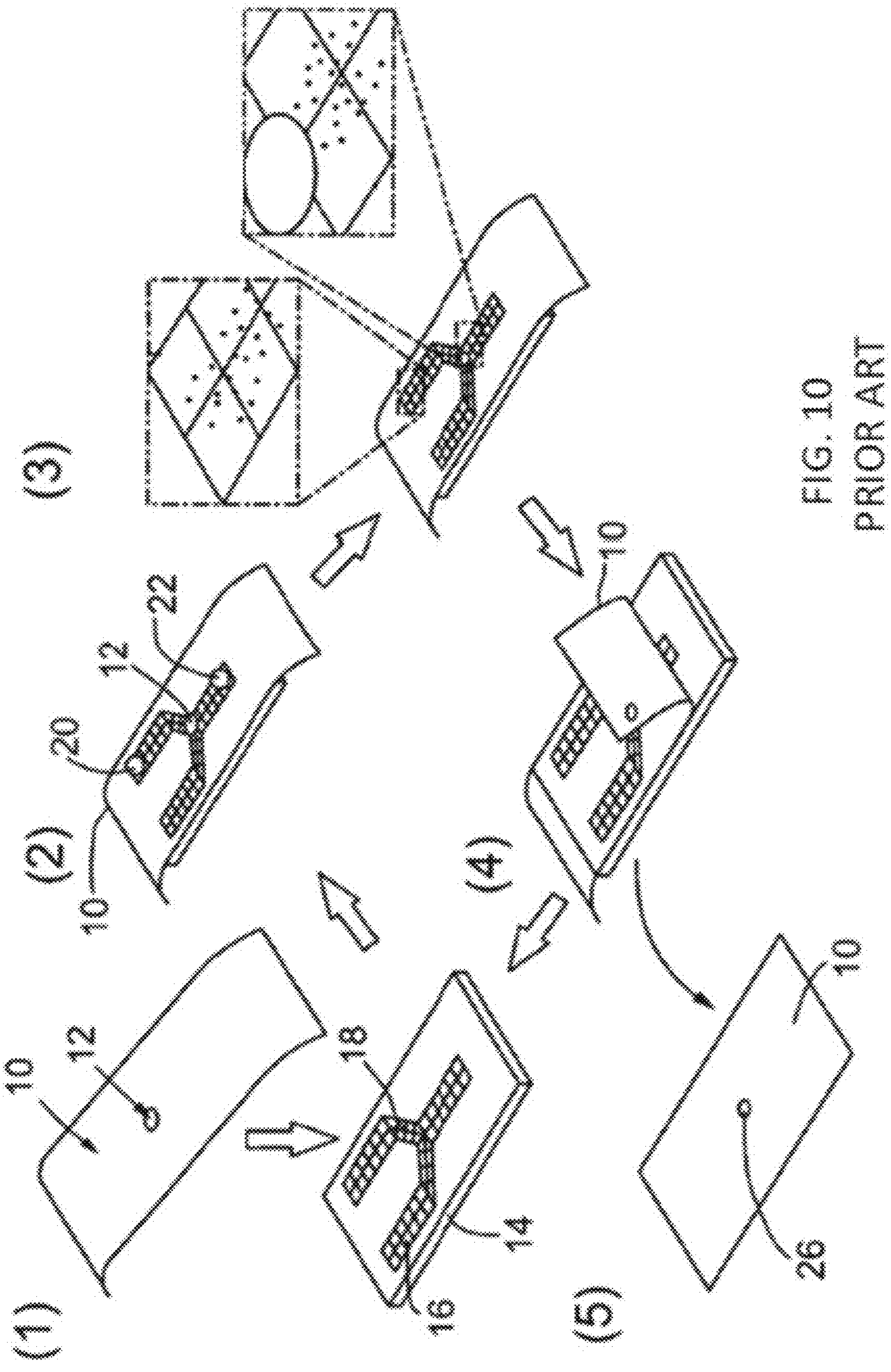
FIG. 10 PRIOR ART
FIG. 10 is a schematic depicting a removable film or sheet with electrodes and/or pre-loaded with reagents that can be attached to one of the plates.

FIG. 10 is a schematic depicting a removable film or sheet with electrodes and/or pre-loaded with reagents that can be removably attached to one of the plates. The film 10 may optionally have an at least one pre-loaded reagent depot 12 mounted (i.e. spotted and dried/frozen) on a hydrophobic front surface of the film 10. This disposable substrate 10 may be any thin dielectric sheet or film so long as it is chemically stable toward the reagents pre-loaded thereon. For example, any polymer based plastic may be used, such as for example saran wrap. In addition to plastic food-wrap, other substrates, including generic/clerical adhesive tapes and stretched sheets of paraffin, were also evaluated for use as replaceable DMF substrates.

As shown, the disposable sheet 10 can be affixed to the electrode array 16 of the DMF device 14 with a back surface of the sheet 10 adhered or suctioned to the electrode array 16 in which the reagent depot 12 deposited on the surface of the sheet 10 (across which the reagent droplets are translated) is aligned with pre-selected individual electrode 18 of the electrode array 16 as shown in steps (1) and (2) of FIG. 10. One or more reagents droplets 20 and 22 can deposited onto the device prior to or during an assay. As can be seen from step 3 of FIG. 10, during the assay reagent droplets 20 and 22 can be actuated over the top of film 10 to facilitate mixing and merging of the assay reagent droplets 20 and 22 with the desired reagent depot 12 over electrode 18.

After the reaction has been completed, the disposable film 10 may then be peeled off as shown in step (4) and the resultant reaction products 26 analyzed if desired as shown in step (5). A fresh disposable film 10 may then be attached to the DMF device 14 for the next round of analysis. The product 26 can be also analyzed while the removable substrate is still attached to the device DMF device 14. This process can be recycled by using additional pre-loaded substrates. In addition, the droplets containing reaction product(s) may be split, mixed with additional droplets, incubated for cell culture if they contain cells.

Figure 11:
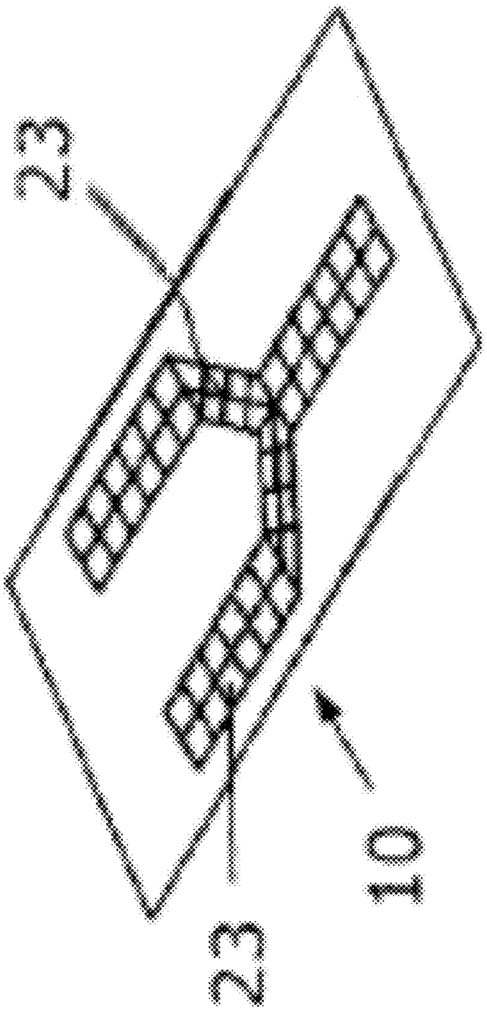
FIG. 11 PRIOR ART
FIG. 11 is a removable film with electrodes that can be attached to one of the plates.

In some embodiments as shown in FIG. 11, the film 10 may also have a plurality of electrodes 23 that are attached and/or embedded within the film 10. The film 10 may have electrical contacts and/or junctions that electrically couple the film 10 and electrodes 23 to complementary electrical contacts and junctions on the top or bottom plate of the DMF device. In this embodiment, the plate to which the film 10 is attached may not have any electrodes and instead may only have electrical contacts and/or junctions for electrically coupling with the film 10.

The air gap DMF apparatuses described herein may also include other elements for providing the needed reaction conditions. For instance, the air gap DMF apparatuses may include one or more thermal regulators (e.g., heating or cooling element such as thermoelectric modules) for heating and cooling all or a region (thermal zone) of the air gap. In other instances, heating or cooling may be provided by controlling endothermic or exothermic reactions to regulate temperature. The air gap DMF apparatuses may also include temperature detectors (e.g., resistive temperature detector) for monitoring the temperature during a reaction run. In addition, the DMF apparatuses may also include one or more magnets that can be used to manipulate magnetic beads in an on demand fashion. For example, the magnet(s) can be an electromagnet that is controlled by a controller to generate a magnetic field that can agitate or immobilize magnetic beads.

Thus, the air gap DMF apparatuses described herein may include one or more thermal zones. Thermal zones are regions on the air gap DMF apparatuses (e.g., the air gap) that may be heated or cooled, where the thermal zones may transfer the heating or cooling to a droplet within the thermal zone through one or more surfaces in contact with the air gap region in the zone (e.g., the first plate). Heating and cooling may be through a thermal regulator such as a thermoelectric module or other type of temperature-modulating component. The temperature of one or many thermal zones may be monitored through a temperature detector or sensor, where the temperature information may be communicated to a computer or other telecommunication device. The temperature is typically regulated between 4° C. and 100° C., as when these apparatuses are configured to perform one or more reactions such as, but not limited to: nucleic acid amplifications, like LAMP, PCR, molecular assays, cDNA synthesis, organic synthesis, etc.

An air gap DMF apparatus may also include one or more thermal voids. Thermal voids may be disposed adjacent to the different thermal zones. The thermal voids are typically regions in which heat conduction is limited, e.g., by removing part of the plate (e.g., first plate) (forming the "void"). These voids may be strategically placed to isolate one thermal zone from another which allows the correct temperatures to be maintained within each thermal zone.

In general, any of the air-matrix DMF apparatuses described herein may include a separate reaction chamber that is separate or separable from the air gap of the apparatus, but may be accessed through the air gap region. The reaction chamber typically includes a reaction chamber opening that is continuous with the lower surface of the air gap (e.g., the first plate), and a reaction chamber well that forms a cup-like region in which a droplet may be controllably placed (and in some variations, removed) by the apparatus to perform a reaction when covered. The cover may be a mechanical cover (e.g., a cover the seals or partially seals the reaction chamber opening, or a cover that encapsulates, encloses or otherwise surrounds the reaction droplet, such as an oil or wax material that mixes with (then separates from and surrounds) the reaction droplet when the two are combined in the reaction chamber.

In general, the reaction chamber opening may be any shape or size (e.g., round, square, rectangular, hexagonal, octagonal, etc.) and may pass through the first (e.g., lower) plate, and into the reaction chamber well. In some variations, the reaction chamber opening passes through one or more actuation electrodes; in particular, the reaction chamber opening may be completely or partially surrounded by an actuation electrode.

FIG. 1 shows a top view of an exemplary air-matrix DMF apparatus 101. As shown, the DMF device may include a series of paths defined by actuation electrodes. The actuation electrodes 103 are shown in FIG. 1 as a series of squares, each defining a unit cell. These actuation electrodes may have any appropriate shape and size, and are not limited to squares. For example, the unit cells formed by the actuation electrodes in the first layer may be round, hexagonal, triangular, rectangular, octagonal, parallelogram-shaped, etc. In the example of FIG. 1, the squares representing the unit cells may indicate the physical location of the actuation electrodes in the DMF device or may indicate the area where the actuation electrode has an effect (e.g., an effective area such that when a droplet is situated over the denoted area, the corresponding actuation electrode may affect the droplet's movement or other physical property). The actuation electrodes 103 may be placed in any pattern. In some examples, actuation electrodes may span the entire corresponding bottom or top surface the air gap of the DMF apparatus. The actuation electrodes may be in electrical contact with starting sample chambers (not shown) as well as reagent chambers (not shown) for moving different droplets to different regions within the air gap to be mixed with reagent droplets or heated.

In the air-matrix apparatuses described herein, the first (lower) plate may also include one or more reaction chamber openings (access holes) 105, 105'. Access to the reaction chamber wells may allow reaction droplets to be initially introduced or for allowing reagent droplets to be added later. In particular, one or more reaction droplets may be manipulate in the air gap (moved, mixed, heated, etc.) and temporarily or permanently moved out of the air gap and into a reaction chamber well though a reaction chamber opening. As shown, some of the reaction chamber openings 105' pass through an actuation electrode. As will be shown in greater detail herein, the reaction chamber may itself include additional actuation electrodes that may be used to move a reaction chamber droplet into/out of the reaction chamber well. In some variations one or more actuation electrodes may be continued (out of the plane of the air gap) into the reaction chamber well.

In general, one or more additional reagents may be subsequently introduced either manually or by automated means in the air gap. In some instances, the access holes may be actual access ports that may couple to outside reservoirs of reagents or reaction components through tubing for introducing additional reaction components or reagents at a later time. As mentioned, the access holes (including reaction chamber openings) may be located in close proximity to a DMF actuation electrode(s). Access holes may also be disposed on the side or the bottom of the DMF apparatus. In general, the apparatus may include a controller 110 for controlling operation of the actuation electrodes, including moving droplets into and/or out of reaction chambers. The controller may be in electrical communication with the electrodes and it may apply power in a controlled manner to coordinate movement of droplets within the air gap and into/out of the reaction chambers. The controller may also be electrically connected to the one or more temperature regulators (thermal regulators 120) to regulate temperature in the thermal zones 115. One or more sensors (e.g., video sensors, electrical sensors, temperature sensors, etc.) may also be included (not shown) and may provide input to the controller which may use the input from these one or more sensors to control motion and temperature.

As indicated above, surface fouling is an issue that has plagued microfluidics, including DMF devices. Surface fouling occurs when certain constituents of a reaction mixture irreversibly adsorbs onto a surface that the reaction mixture is in contact with. Surface fouling also appears more prevalent in samples containing proteins and other biological molecules. Increases in temperature may also contribute to surface fouling. The DMF apparatuses and methods described herein aim to minimize the effects of surface fouling. One such way is to perform the bulk of the reaction steps in a reaction chamber that is in fluid communication with the air gap layer. The reaction chamber may be an insert that fits into an aperture of the DMF device as shown in FIGS. 2B and 2C. FIG. 2B shows the floor (e.g., first plate) of an air gap region coupled to a centrifuge (e.g., Eppendorf) tube 205 while FIG. 2C incorporates a well-plate 207 (e.g., of a single or multi-well plate) into the floor of the air gap region. A built-in well 209 may also be specifically fabricated to be included in the air-matrix DMF apparatus as shown in FIG. 2D. When a separate or separable tube or plate is used, the tubes may be coupled to the DMF device using any suitable coupling or bonding means (e.g., snap-fit, friction fit, threading, adhesive such as glue, resin, etc., or the like).

In general, having a dedicated reaction chamber within the DMF device minimizes surface fouling especially when the reaction is heated. Thus, while surface fouling may still occur within the reaction chamber, it may be mainly constrained to within the reaction chamber. This allows the majority of the air gap region floor to remain minimally contaminated by surface fouling and clear for use in subsequent transfer of reagents or additional reaction materials if needed, thus allowing for multi-step or more complex reactions to be performed. When the reaction step or in some instances, the entire reaction is completed, the droplet containing the product may be moved out of the reaction chamber to be analyzed. In some examples, the product droplet may be analyzed directly within the reaction chamber.

Figure 3A:
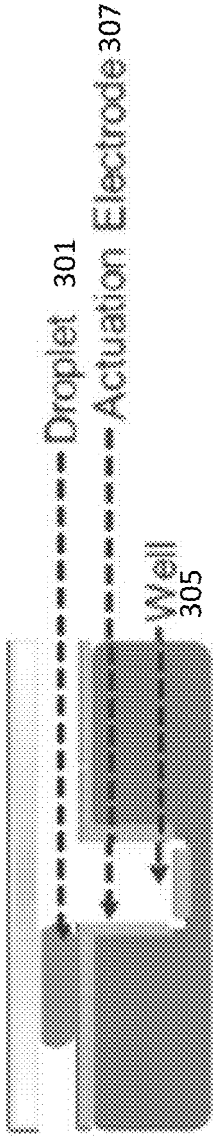
FIGS. 3A-3E illustrate movement (e.g., controlled by a controller of an air-matrix DMF apparatus) into and then out of a reaction chamber, as described herein. In this example, the reaction chamber well is shown in a side view of the air-matrix DMF apparatus and the reaction chamber is integrally formed into a plate (e.g., a first or lower plate) of the air-matrix DMF apparatus which includes actuation electrodes (reaction well actuation electrodes) therein.

In order to bring the droplet(s) containing the starting materials and the reagent droplets into the reaction chamber, additional actuation electrodes, which may also be covered/coated with a dielectric and a hydrophobic layer (or a combined hydrophobic/dielectric layer), may be used. FIGS. 3A-3E shows a series of drawings depicting droplet 301 movement into and out of an integrated well 305. As this series of drawings show, in addition to lining the floor of the air gap layer, additional actuation electrodes 307 line the sides and the bottom of the well. In some variations, the same actuation electrode in the air gap may be extended into the reaction chamber opening. The actuation electrodes 307 (e.g., the reaction chamber actuation electrodes) may be embedded into or present on the sides and bottom of the well for driving the movement of the droplets into/out of the reaction chamber well. Actuation electrodes may also cover the opening of the reaction chamber. In FIG. 3A, a droplet 301 (e.g., reaction droplet) in the air gap layer may be moved (using DMF) to the reaction chamber opening. The actuation electrodes 307 along the edge of the well and the sides of the well maintain contact with the droplet as it moved down the well walls to the bottom of the well (shown in FIGS. 3B and 3C). Once in the reaction chamber well, the droplet may be covered (as described in more detail below, either by placing a cover (e.g., lid, cap, etc.) over the reaction chamber opening and/or by mixing the droplet with a covering (e.g., encapsulating) material such as an oil or wax (e.g., when the droplet is aqueous). In general, the droplet may be allowed to react further within the well, and may be temperature-regulated (e.g., heated, cooled, etc.), additional material may be added (not shown) and/or it may be observed (to detect reaction product). Alternatively or additionally, the droplet may be moved out of the well using the actuation electrodes; if a mechanical cover (e.g., lid) has been used, it may be removed first. If an encapsulating material has been used it may be left on.

In some variations contacts may penetrate the surfaces of the reaction chamber. For example, there may be at least ten electrical insertion points in order to provide sufficient electrical contact between the actuation electrodes and the interior of the reaction chamber. In other examples there may need to be at least 20, 30, or even 40 electrical insertion points to provide sufficient contact for all the interior surfaces of the reaction chamber. The interior of the reaction chamber may be hydrophobic or hydrophilic (e.g., to assist in accepting the droplet). As mentioned, an electrode (actuation electrode) may apply a potential to move the droplets into and/or out of the well.

Figure 3B:
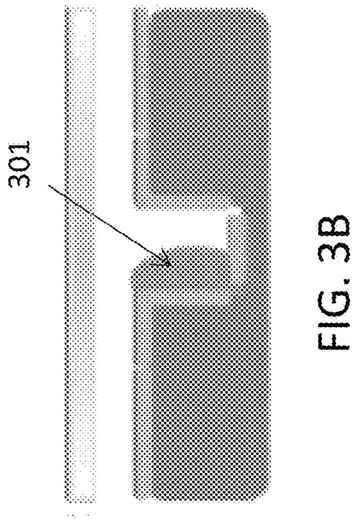
Figure 3C:
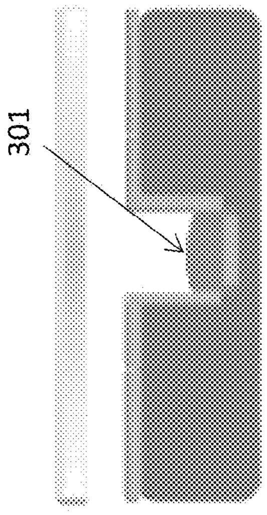
Figure 3D:
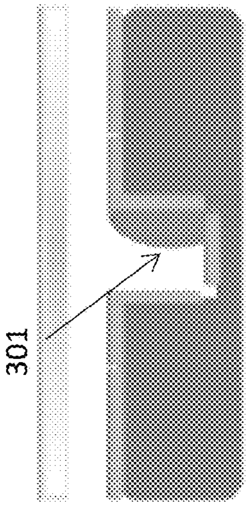
Figure 3E:
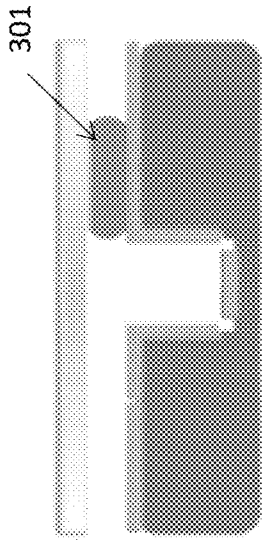

In general, the actuation electrodes may bring the droplet into the well in a controlled manner that minimizes dispersion of the droplet as it is moved into the well and thus maintaining as cohesive a sample droplet as possible. FIGS. 3D and 3E show the droplet being moved up the wall of the well and then out of the reaction chamber. This may be useful for performing additional subsequent steps or for detecting or analyzing the product of interest within the droplet, although these steps may also or alternatively be performed within the well. Actuation electrodes may be on the bottom surface, the sides and the lip of the well in contact with the air gap layer; some actuation electrodes may also or alternatively be present on the upper (top) layer.

Figure 2A:
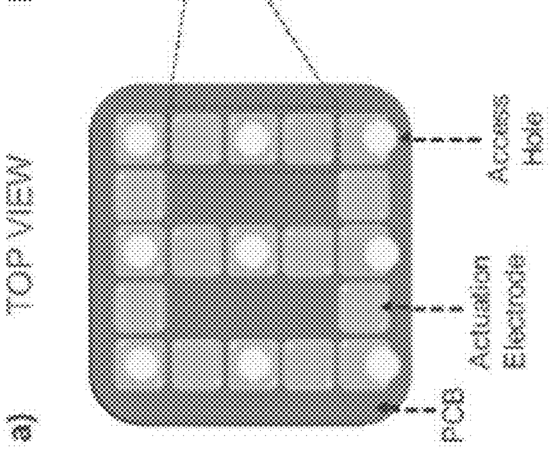
FIG. 2A shows the top view of FIG. 1 and FIGS. 2B-2D show side views of variations of reaction chamber wells that may be used in an air-matrix DMF apparatus.
Figure 2B:
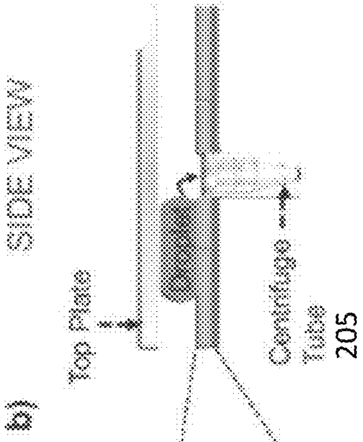
In FIG. 2B the reaction chamber well comprises a centrifuge tube.
Figure 2C:
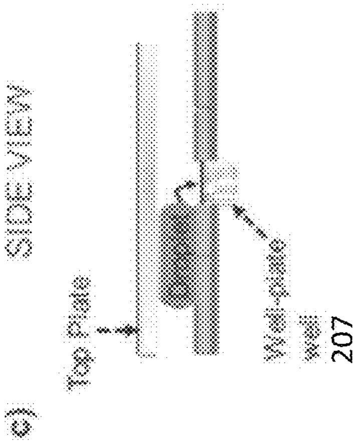
in FIG. 2C the reaction chamber well comprises a well plate (which may be part of a multi-well plate); and in FIG. 2D the reaction chamber well is formed as part of the pate of the air-matrix DMF apparatus.
Figure 2D:
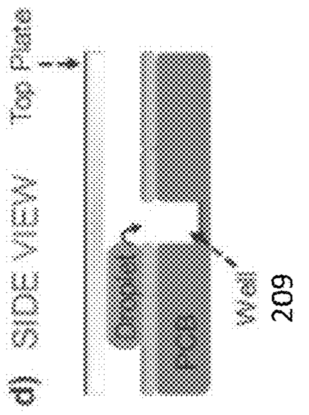

In instances where the reaction compartment is an independent structure integrated with the DMF devices as those shown in FIGS. 2A and 2B, the thickness of the substrate (e.g., PCB) may be similar to what is commonly used in DMF fabrication. When the reaction compartment is an integrated well structure fabricated in the bottom plate of the DMF device as shown in FIG. 2D, the thickness of the substrate may be equivalent to the depth of the well.

In another embodiment, the electrodes embedded in the reaction compartments can include electrodes for the electrical detection of the reaction outputs. Electrical detection methods include but are not limited to electrochemistry. In some instances, using the changes in electrical properties of the electrodes when the electrodes contact the reaction droplet, reagent droplet, or additional reaction component to obtain information about the reaction (e.g., changes in resistance correlated with position of a droplet).

The apparatuses described herein may also prevent evaporation. Evaporation may result in concentrating the reaction mixture, which may be detrimental as a loss of reagents in the reaction mixture may alter the concentration of the reaction mixture and result in mismatched concentration between the intermediate reaction droplet with subsequent addition of other reaction materials of a given concentration. In some variations, such as with enzymatic reactions, enzymes are highly sensitive to changes in reaction environment and loss of reagent may alter the effectiveness of certain enzymes. Evaporation is especially problematic when the reaction mixture has to be heated to above ambient temperature for an extended period of time. In many instances, microfluidics and DMF devices utilize an oil-matrix for performing biochemical type reactions in microfluidic and DMF devices to address unwanted evaporation. One major drawback of using an oil matrix in the DMF reaction is the added complexity of incorporating additional structures to contain the oil.

The methods and apparatuses described herein may prevent or limit evaporation by the use of wax (e.g., paraffin) in minimizing evaporation during a reaction. A wax substance may include substances that are composed of long alkyl chains. Waxes are typically solids at ambient temperatures and have a melting point of approximately 46° C. to approximately 68° C. depending upon the amount of substitution within the hydrocarbon chain. However, low melting point paraffins can have a melting point as low as about 37° C., and some high melting point waxes can have melting points about 70-80° C. In some instances higher melting point waxes may be purifying crude wax mixtures.

As mentioned, wax is one type of sealing material that may be used as a cover (e.g., within a reaction chamber that is separate from the plane of the air gap). In some variations, wax may be used within the air gap. In particular, the wax may be beneficially kept solid until it is desired to mix it with the reaction droplet so that it may coat and protect the reaction droplet. Typically the wax material (or other coating material) may be mixed with the reaction droplet and enclose (e.g., encapsulate, surround, etc.) the aqueous reaction droplet.

When a reaction droplet is maintained within a paraffin coating, not only is evaporation minimized, but the paraffin may also insulate the reaction droplet from other potentially reaction interfering factors. In some instances, a solid piece of paraffin or other wax substance may be placed within a thermal zone of the air gap layer of the DMF device. For example, during a reaction, actuation electrodes may move a reaction droplet to a wax (e.g., paraffin) body. Upon heating to a melting temperature, the wax body may melt and cover the reaction droplet. The reaction then may continue for an extended period of time (including at elevated temperatures) without need to replenish the reaction solvents, while preventing loss by evaporation. For example wax-encapsulated droplet may be held and/or moved to a thermal zone to control the temperature. The temperature may be decreased or increased (allowing control of the phase of the wax as well, as the wax is typically inert in the reactions being performed in the reaction droplet). The temperature at that particular thermal zone may be further increased to melt the paraffin and release the reaction droplet. The reaction droplet may be analyzed for the desired product when encapsulated by the liquid or solid wax, or it may be moved to another region of the DMF device for further reaction steps after removing it from the wax covering. Paraffins or other wax materials having the desired qualities (e.g. melting point above the reaction temperature) may be used. For example, paraffins typically have melting points between 50 and 70 degrees Celsius, but their melting points may be increased with increasing longer and heavier alkanes.

Figure 4A:
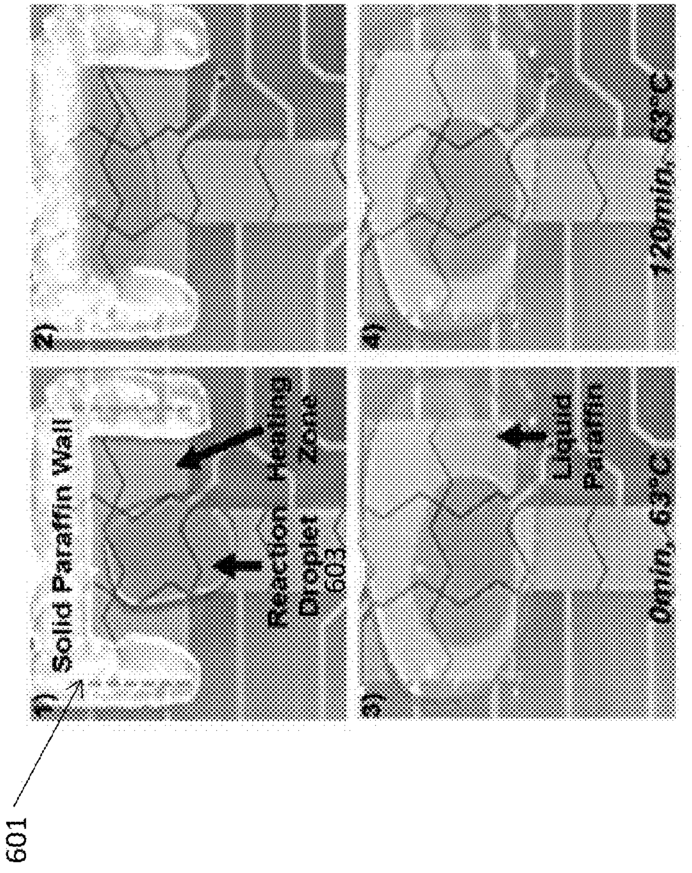
FIG. 4A shows a time series of photos of an air matrix DMF apparatus including a wax (in this example, paraffin) body which is melted and covers a reaction droplet.
Figure 4B:
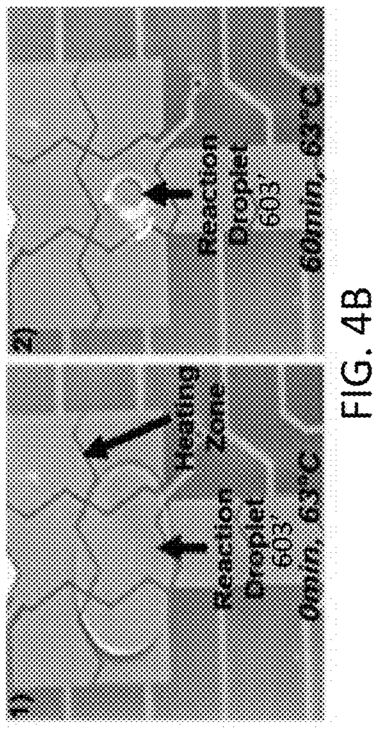
FIG. 4B is an example of a time series similar to that shown in FIGS. 4A(3) and 4A(4), without using a wax body to cover the reaction droplet, showing significant evaporation.

FIG. 4A shows a time-sequence images (numbered 1-4) taken from an example using a wax body within the air matrix as discussed above, showing profound reduction in evaporation as compared to a control without wax (shown in FIG. 4B, images 1-2). In FIG. 4A, the first image, in the top right, shows an 8 μL reaction droplet 603 that has been moved by DMF in the air matrix apparatus to a thermal zone ("heating zone") containing a solid wax body (e.g., paraffin wall 601). Once in position, the reaction droplet may be merged with a solid paraffin wall (e.g., thermally printed onto DMF), as shown in image 2 of FIG. 4A, or the wax material may be melted first (not shown). In FIG. 4A image 3, the thermal zone is heated (63° C.) to or above the melting point of the wax material thereby melting the paraffin around the reaction droplet, and the reaction droplet is surrounded/encapsulated by the wax material, thus preventing the droplet from evaporation as shown in FIG. 4A images 3 and 4. Using this approach, in the example shown in FIG. 4A image 4, the volume of reaction droplets was maintained roughly constant at 63° C. for an incubation time approximately two hours long (120 min). An equivalent experiment without the paraffin wall was performed, and shown in FIG. 4B. The left picture (image 1) in FIG. 4B shows the reaction droplet 603' at time zero at 63° C. and the right picture of FIG. 4B shows the reaction droplet after 60 minutes at 63° C. As shown, the reaction droplet almost completely evaporated within approximately an hour's time at 63° C.

Through this approach of enclosing a droplet in a shell of liquid wax, the reaction volume and temperature are maintained constant without the use of oil, a humidified chamber, off-chip heating, or droplet replenishment methods. Waxes other than paraffin can be used to prevent droplet evaporation as long as their melting temperature is higher than the ambient temperature, but lower or equal to the reaction temperature. Examples of such waxes include paraffin, bees and palm waxes. The wax-like solids can be thermally printed on the DMF device surface by screen-, 2D- or 3D-printing. This wax-mediated evaporation prevention solution is an important advancement in developing air-matrix DMF devices for a wide variety of new high-impact applications.

As mentioned, the wax-based evaporation methods described may be used in conjunction with the DMF devices having a reaction chamber feature, or they may be used without separate reaction chambers. When used within a reaction chamber, the wax may be present in the reaction chamber and the reaction droplet may be moved to the reaction chamber containing wax for performing the reaction steps requiring heating. Once the heating step has completed, the reaction droplet may be removed from the reaction chamber for detection or to perform subsequent reaction steps within the air gap layer of the DMF device.

In other embodiments, the wax may be liquid at room temperature or an oil can be used instead of a wax or a solid wax can be heated until it is liquid. Instead of a heated reaction zone with wax, the liquid wax or oil can be mixed with a reagent before introducing the mixture into the DMF device in order to prevent the reagent from evaporating. The reagent droplet will then have a liquid wax or oil shell surrounding the reagent, which can be manipulated as described above. In some embodiments, the liquid wax/oil can be added manually to the reagent by the user. In other embodiments, the liquid wax/oil and the reagent can be dispensed from reservoirs, mixed together, and introduced into the DMF device using a pump by the DMF device.

The methods and apparatuses described herein may be used for preventing evaporation in air-matrix DMF devices and may enable facile and reliable execution of any chemistry protocols on DMF with the requirement for a temperature higher than the ambient temperature. Such protocols include, but are not limited to, DNA/RNA digestion/fragmentation, cDNA synthesis, PCR, RT-PCR, isothermal reactions (LAMP, rolling circle amplification-RCA, Strand Displacement Amplification-SDA, Helicase Dependent Amplification-HDA, Nicking Enzyme Amplification reaction-NEAR, Nucleic acid sequence-based amplification-NASBA, Single primer isothermal amplification-SPIA, cross-priming amplification-CPA, Polymerase Spiral Reaction-PSR, Rolling circle replication-RCR), as well as ligation-based detection and amplification techniques (ligase chain reaction-LCR, ligation combined with reverse transcription polymerase chain reaction-RT PCR, ligation-mediated polymerase chain reaction-LMPCR, polymerase chain reaction/ligation detection reaction-PCR/LDR, ligation-dependent polymerase chain reaction-LD-PCR, oligonucleotide ligation assay-OLA, ligation-during-amplification-LDA, ligation of padlock probes, open circle probes, and other circularizable probes, and iterative gap ligation-IGL, ligase chain reaction-LCR, over a range of temperatures (37-100° C.) and incubation times (≥2 hr). Additional protocols that can be executed using the systems and methods described herein include hybridization procedures such as for hybrid capture and target enrichment applications in library preparation for new generation sequencing. For these types of applications, hybridization can last up to about 3 days (72 h). Other protocols include end-repair, which can be done, for example, with some or a combination of the following enzymes: DNA Polymerase I, Large (Klenow) Fragment (active at 25° C. for 15 minutes), T4 DNA Polymerase (active at 15° C. for 12 minutes), and T4 Polynucleotide Kinase (active at 37° C. for 30 minutes). Another protocol includes A-Tailing, which can be done with some or a combination of the following enzymes: Taq Polymerase (active at 72° C. for 20 minutes), and Klenow Fragment (3'→5' exo-) (active at 37° C. for 30 minutes). Yet another protocol is ligation by DNA or RNA ligases.

Manipulation and Processing of Encapsulated Droplets

Although the encapsulation of droplets in wax may prevent or reduce evaporation while executing chemistry protocols at elevated temperatures, after protocol completion, it has been discovered that when the droplet is removed and separated from the wax, e.g., by driving the droplet using the electrodes of the DMF apparatus, a small amount of liquid wax remains with the droplet as a coating even when the aqueous droplet is moved away from the wax, and that this wax coating may prevent or interfere with subsequent processing and analysis of the reaction droplet, particularly as the droplet cools and the wax solidifies around the droplet after the droplet is moved out of the heating zone. Therefore, in some embodiments, the wax encapsulated reaction droplet can be accessed through the wax coating using the systems and methods described herein, which enables facile and reliable execution of downstream biochemical processes.

To access the reaction droplet through the wax coating after the reaction droplet has been separated from the bulk liquid wax in the heating zone, an additional hydrophobic (e.g., oil) material may be added to the reaction droplet to help dissolve the solidified wax encapsulated the reaction droplet. For example, a carrier droplet (i.e., an aqueous droplet enclosed in a thin layer of oil) can be merged with the encapsulated reaction droplet. The carrier droplet gains access to the reaction droplet by having the oil from the carrier droplet dissolve and/or merge with the thin wax layer encapsulating the reaction droplet. Other materials other than oil may be used by the carrier droplet to break through the wax layer encapsulating the reaction droplet. For example, materials that are immiscible with aqueous reaction droplet and are capable of dissolving wax may be used, such as carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane, and other organic solvents. Other materials that may be used to break through the wax layer include ionic detergents such as cetyltrimethylammonium bromide, Sodium deoxycholate, n-lauroylsarcosine sodium salt, sodium n-dodecyl Sulfate, sodium taurochenodeoxycholic; and non-ionic detergents such as dimethyldecylphosphine oxide (APO-10), dimethyldodecylphosphine oxide (APO-12), n-Dodecyl-β-D-maltoside (ULTROL®), n-dodecanoylsucrose, ELUGENT™ Detergent, GENAPOL® C-100, HECAMEG®, n-Heptyl β-D-glucopyranoside, n-Hexyl-b-D-glucopyranoside, n-Nonyl-b-D-glucopyranoside, NP-40 Alternative, n-Octanoylsucrose, n-Octyl-b-D-glucopyranoside, n-Octyl-b-D-thioglucopyranoside, PLURONIC® F-127, Saponin, TRITON® X-100, TRITON® X-114, TWEEN® 20, TWEEN® 80, Tetronic 90R4. At temperatures where a wax remains liquid, a carrier droplet encapsulated with wax may also be used to break through the wax encapsulating the reaction droplet. However, for lower temperatures where the wax solidifies, a carrier droplet coated with wax generally cannot be used since solid wax will prevent droplet movement.

Figure 7A:
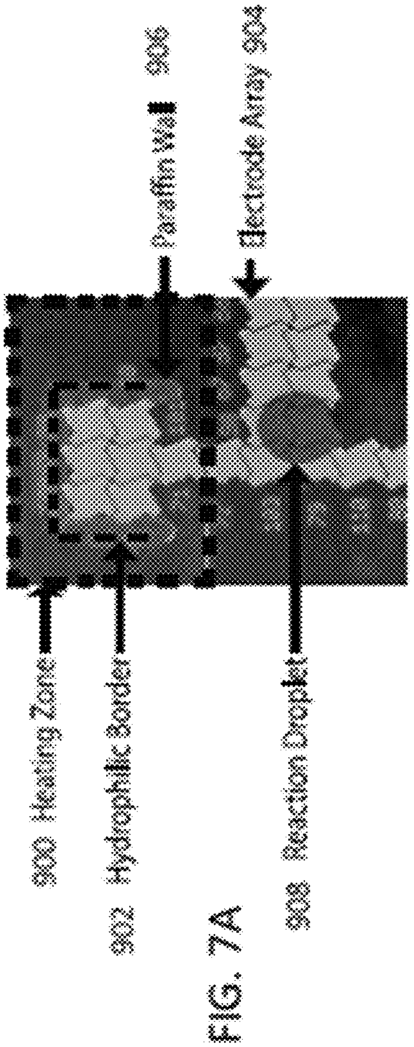
FIGS. 7A and 7B show the encapsulation of a droplet within wax in a thermal zone and the subsequent separation of the droplet from the liquid wax.
Figure 7B:
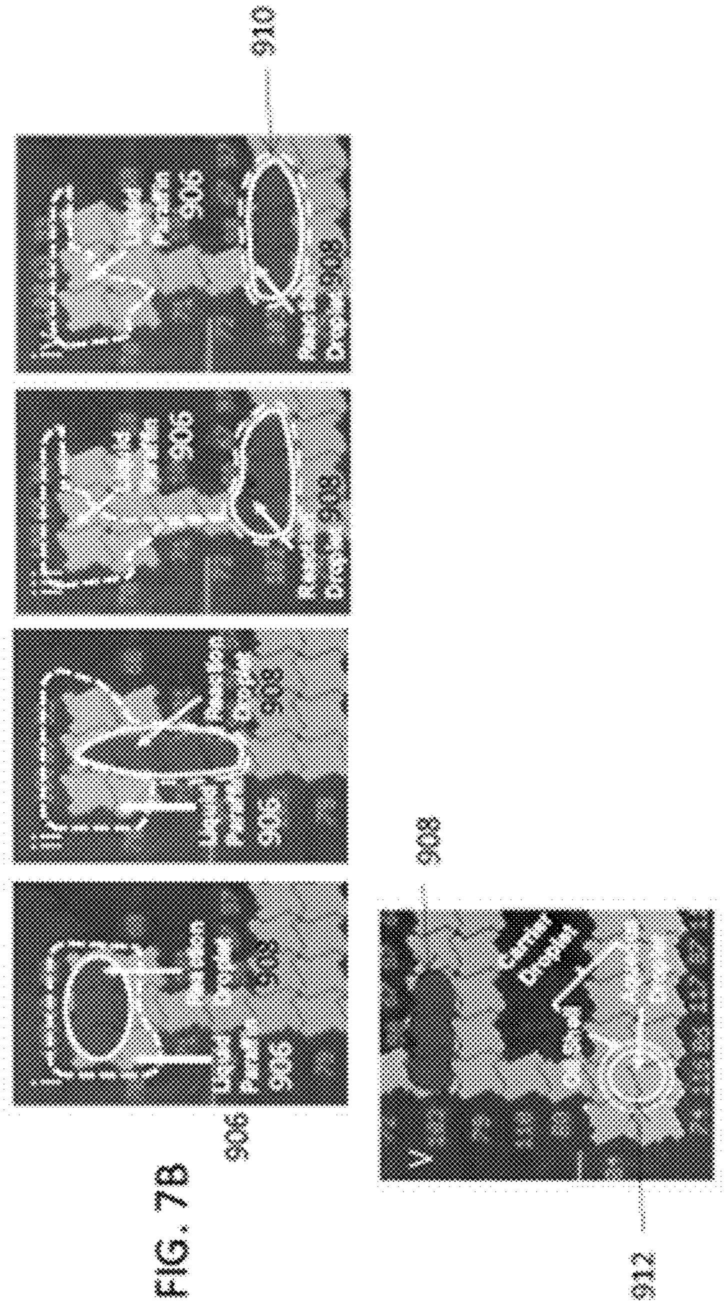

For example, FIG. 7A illustrates a setup similar or the same as that shown in FIG. 4A. The setup includes a DMF device interfaced to a heating element placed below or within the bottom DMF substrate, hence generating discrete heating zones 900 on the bottom DMF substrate. Alternatively, the heating element can be placed above or within the top substrate to form a heating zone on the top substrate. However, forming the heating zone on the bottom substrate allows visual access. On the bottom substrate, a hydrophilic region 902 is printed or otherwise formed or disposed around the actuating electrodes in the electrode array 904 that are in the heating zone 900. One or more wax walls 906 or wax structures, which can be solid at room temperature, can be assembled on the top substrate by, for example, thermal printing to overlay a portion of the hydrophilic region 902 adjacent to the electrodes in the heating zone 900 on the bottom plate when the DMF device is assembled. Alternatively, the wax walls 906 or wax structures can be formed directly on the bottom plate around the electrodes in the heating zone 900. In yet another embodiment, the wax walls 906 can be placed on a removable sheet that can be removably attached to either the top plate or the bottom plate. The removable sheet can have a hydrophobic surface on one side for interacting with the droplet and an adhesive on the other side for adhering to the top or bottom plate. Reagents and other materials can also be placed on the removable sheet to interact with the droplets. In some embodiments, the top plate or the bottom plate can be part of a removable cartridge that is combined with the other plate and electronics to form the working DMF device. As described herein, a reaction droplet 908 can be transported to the heating zone 900 along a path of actuating electrodes, which may be a relatively narrow path formed by a single line of actuating electrodes to the heating zone 900. Then the heating zone 900 is heated, and the wax wall 906 surrounding the heating zone 900 and reaction droplet 908 melts to encapsulate the reaction droplet 908 in liquid wax 910 as shown in FIG. 7B (frame i), thereby preventing or reducing evaporation from the reaction droplet 908 during the reaction protocol. The hydrophilic region 902 surrounding the heating zone 900 functions to pin or localize the liquid wax 910 in place in the heating zone 900 and allows the reaction droplet 908 to break away as described below.

As shown in FIG. 7B (frames ii-iv), the process of breaking away or separating the encapsulated reaction droplet 908 from liquid wax 910 can be accomplished by driving the aqueous reaction droplet 908 away from the heating zone 900 and the liquid wax 910 by actuating the actuating electrodes in the heating zone and path. As the aqueous reaction droplet 908 is actuated away from the heating zone 900, the hydrophilic region 902 surrounding the liquid wax 910 helps hold the liquid wax 910 in place as the reaction droplet 908 moves away from the heating zone 900, which causes the liquid wax 910 encasing the droplet 908 to begin to neck and eventually break off from the droplet 908, thereby leaving trace or small quantities of liquid wax 910 surrounding the separated reaction droplet 908. In general, the heating zone 900 is single use only to avoid cross-contamination. However, in situations where cross-contamination is not an issue, the heating zone 900 may be reused by heating and melting the wax within the heating zone and then moving the next droplet into the reheated liquid wax 910.

Figures 8A, 8B, 8C:
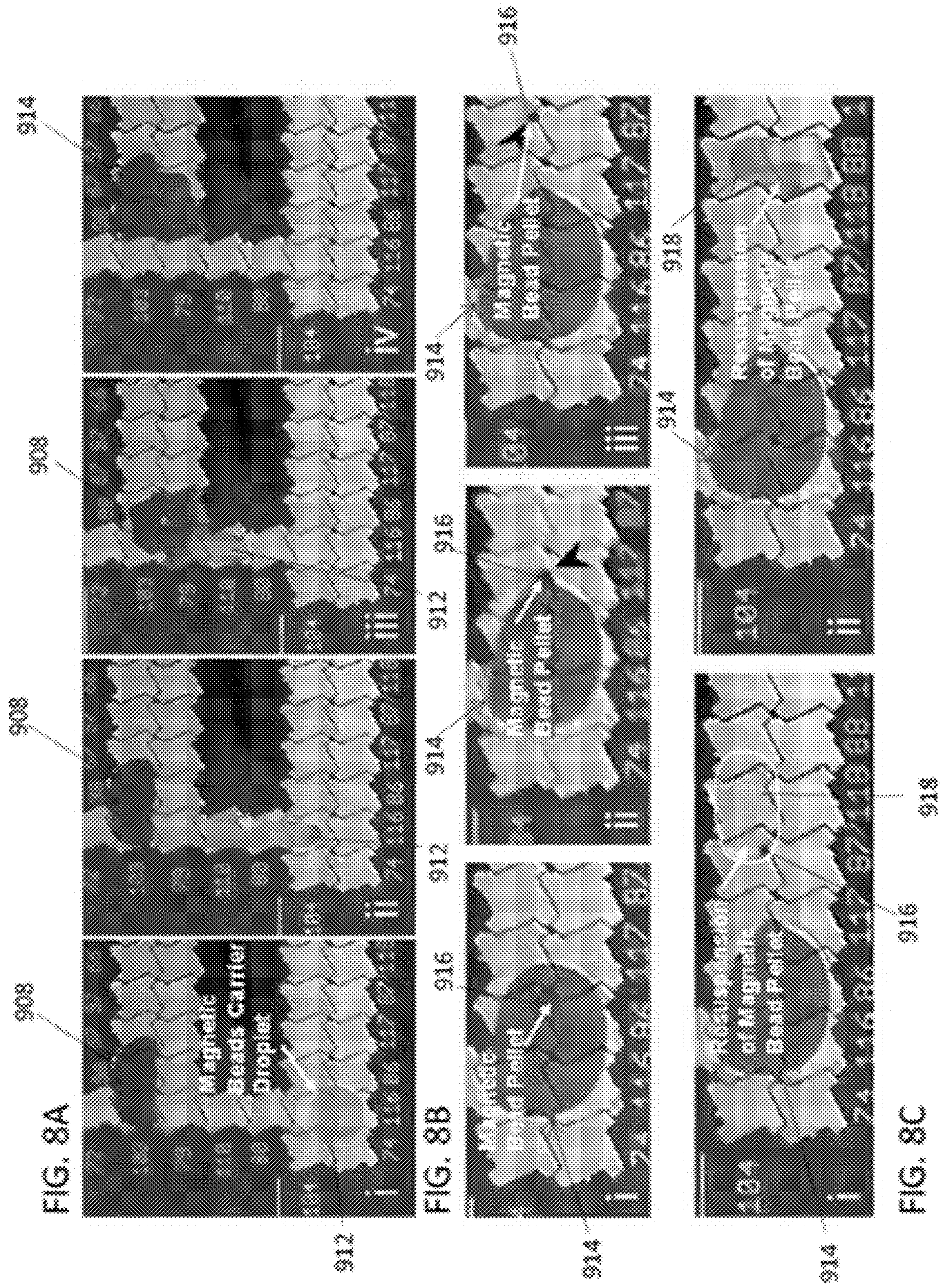
FIGS. 8A-8C show the merging of a carrier droplet with beads with the droplet from FIGS. 7A and 7B and the subsequent separation and re-suspension of the beads.

Because the reaction droplet may be surrounded by a thin layer of liquid wax 910 after separation from the heating zone 900, it may be difficult to merge the reaction droplet 908 with another aqueous droplet since the liquid wax 910 coating may act as a barrier. In addition, the liquid wax 910 may solidify as the droplet cools to form a physical barrier that impedes merger with another droplet. Therefore, to facilitate merging of a liquid wax 910 coated reaction droplet 908 or a cooled reaction droplet 908 with a solid wax coating with another droplet, a carrier droplet 912 can be used to merge with the reaction droplet 908 as shown in FIG. 7B (frame v). The carrier droplet 912 can be an aqueous droplet that is coated with a thin layer of oil or another organic solvent as described above. The aqueous portion of the carrier droplet 912 can include additional reagents, beads coated (or not) with DNA/RNA probes or antibodies or antigens for performing separations, uncoated beads, magnetic beads, beads coated with a binding moiety, solid phase reversible immobilization (SPRI) beads, water for dilution of the reaction droplet, enzymes or other proteins, nanopores, wash buffers, ethanol or other alcohols, formamide, detergents, and/or other moieties for facilitating further processing of the reaction droplet 908. As shown in FIG. 8A (frames i-iv), when the carrier droplet 912 and the reaction droplet 908 are moved by the actuating electrodes to the same location, the thin layer of oil surrounding the carrier droplet 912 can merge with the thin layer of liquid wax surrounding the reaction droplet 908, thereby facilitating the merger of the aqueous portions of the two droplets 908, 912 to form a combined droplet 914.

After the carrier droplet 912 has been merged with the reaction droplet 908, further processing of the combined droplet 914 can proceed, such as extracting an analyte from the combined droplet 914 and/or perform other steps such as hybridizing capture probes, digesting the reaction product using an enzyme, amplifying the reaction product with a set of primers, and the like. For example, the carrier droplet 912 can be carrying beads for extracting the analyte, e.g., DNA or RNA or proteins. When the droplets are merged, the beads, which can be magnetic, can be used to mix the combined droplet 914 by application of a magnetic field. The target analyte binds to the beads, which can be immobilized against the substrate by the magnetic field to form a bead pellet 916, as shown in FIG. 8B (frame i). Next, the combined droplet 914 can be moved away from the immobilized bead pellet 916, leaving the bead pellet 916 with bound analyte on the substrate, as shown in FIG. 8B (frames ii-iii). The combined droplet 914 can be moved away from the immobilized bead pellet 916 by actuating the electrodes. Alternatively, the combined droplet 914 can be held in place while the bead pellet 916 is moved away from the combined droplet 914. The bead pellet 916 can be moved away and separated from the combined droplet 914 by, for example, moving the magnetic field (e.g., by moving the magnet generating the magnetic field) that is engaging the bead pellet 916 away from the combined droplet 914. In some embodiments, the combined droplet 914 can be actively immobilized through actuation of the electrodes in contact with the droplet and/or surrounding the droplet. Alternatively or in addition, the droplet 914 can be passively immobilized through natural adhesive forces between the droplet and substrate on which the droplet is contacting, as well as physical structures, such as retaining walls that partially surround the combined droplet 914 while having an opening for passing the bead pellet 916. As shown in FIG. 8C (frames i and ii), an aqueous droplet 918 can be moved over the bead pellet 916 to resuspend the beads with the bound analyte. See Example 3 described below for an embodiment of this procedure used for miRNA purification.

Plasma Extraction

FIGS. 9A-9E illustrate a DMF device 1000 with a sample inlet 1002 for receiving a sample, such as whole blood, and a sample outlet 1004 that deposits a droplet of the sample into the air gap between the top plate 1006 and bottom plate 1008 for manipulation by the actuation electrodes 1010. A separation membrane 1012, such as plasma separation membrane for separating plasma from whole blood, can be positioned between the sample inlet 1002 and sample outlet 1004 for filtering the sample.

To form the sample inlet 1002, a cover plate 1014, with a hole or port that can serve as the sample inlet 1002, can be placed over a hole or port in the top plate 1006 that can serve as the sample outlet 1004. The cover plate 1014 can be made of a hydrophobic or super-hydrophobic material or can be coated with a hydrophobic or super-hydrophobic layer 1016, as shown in FIG. 9B. A water droplet on a super-hydrophobic surface has a contact angle of greater than 150 degrees, while a water droplet on a hydrophobic surface has a contact angle greater than 90 degrees but less than 150 degrees. In addition, the top surface of the top plate 1006 can also be coated with a hydrophobic or super-hydrophobic material. The separation membrane 1012 can sandwiched between the hydrophobic surfaces of the cover plate 1014 and top surface of the top plate 1006. Making these surfaces hydrophobic prevents or greatly reduces the spread of blood out of the sample inlet 1002 and over the cover plate 1014. In addition, as the blood sample saturates and passes through the separation membrane 1012, the hydrophobic surfaces prevent or greatly reduce the spread of blood out of the membrane and into the gap between the cover plate 1014 and top plate 1006. The separation membrane 1012 can be made of a porous, hydrophilic material, with the pore size decreasing through the membrane thickness such that larger pores are located on the sample inlet 1002 side and smaller pores are located on the sample outlet 1004 side. In some embodiments, a gasket can be placed between the cover plate 1014 and top plate 1006 and around the separation membrane 1012 in order to prevent the spread of blood between the cover plate 1014 and top plate 1006. The sample outlet 1004, which can be formed as a hole in the top plate 1006, can optionally have a hydrophilic surface, such as from a hydrophilic coating or layer or from constructing the top plate 1006 from a hydrophilic material. A hydrophilic coating or layer may help draw the plasma through the separation membrane 1012 and into the sample outlet 1004.

For example, in one embodiment, a cover plate 1014 having about a 1 mm to 10 mm ID hole (e.g. a 4 mm ID hole) can be spray-coated on both sides with a super-hydrophobic layer (e.g., ~500 nm layer of NeverWet®) followed by post-baking in an oven (100° C., 10 min). The top plate 1006 of the DMF device 1000 can have about a 1 to 20 mm ID hole (e.g. a 10 mm ID hole) that is aligned with the hole in the cover plate 1014. The hole in the top plate 1006 may be larger than the hole in the cover plate 1014. For example, the hole in the top plate 1006 may be about 3 to 10 mm larger than the hole in the cover plate 1014. The top surface of the top plate 1006 that faces the cover plate 1014 can also be coated with a super-hydrophobic layer (as above) and the other side of the top plate 1006 with the ground electrode can be spin-coated with a hydrophobic layer (e.g., a 50 nm layer of Teflon-AF1600) followed by post-baking as above. The bottom plate 1008 of the DMF device 1000 can be fabricated from a six-layer PCB substrate bearing copper electrodes (e.g., a 43 μm thick layer) plated with nickel (e.g., a 185 μm thick layer) and gold (e.g. a 3.6 μm thick layer) that can be formed by conventional photolithography and etching techniques, and covered with dielectric tape (e.g. a 25 μm thick layer) or coating. The PCB substrate can have an array of electrodes, such as one-hundred and twenty actuation electrodes (e.g. each 3.5 mm×3.5 mm) with inter-electrode gaps of about 10 to 100 μm (e.g. 40 μm). The cover plate 1014 and top plate 100 can be assembled using screws, bolts, snaps, adhesives and/or other fasteners, with the separation membrane (e.g. PALL plasma separation membrane, Ann Arbor, MI) sandwiched in between. The bottom plate 1008 and top plate 1006 can be assembled with one or more spacers disposed between the two plates that separates the two plates by about 100 to 1000 μm (e.g. about 300 μm). For example, the spacer can be formed from one or more layers of double-sided tape (e.g. three pieces of double-sided tape having a total thickness of ~300 μm). The double-sided tape can provide dual functions of spacing and fastening the top plate to the bottom plate.

As described above, in some embodiments, one of the plates can be integrated into a reader device, and the other plate can be integrated into a removable cartridge, that when attached to the reader, form a two plate digital microfluidics system similar to that described herein. In addition, the actuation electrodes can be disposed on a film, which can also be made of a dielectric material. The film can be removably attached to one of the plates, such as the plate on the reader or the plate on the cartridge, while the other plate can have the ground electrode(s). For example, the film can be attached to the PCB substrate of the bottom plate.

The process for extracting plasma from whole blood samples into the DMF device and onto the electrodes is depicted in FIGS. 9A-9E. As shown, a sample of whole blood (e.g. 300 μL) can be spotted directly onto a prewetted (e.g. with tris buffer) separation membrane 1012—faster flow is achieved through the separation membrane 1012 as a result of enhanced capillary forces due to prewetting. The sample can have a volume less than 100 to 5000 μL, or between 100 to 500 μL. The sample can be incubated for less than about 1 to 10 minutes (e.g. 1, 2, 3, 4, or 5 min) or between 1 to 10 minutes, and during that time plasma transfers from the bottom of separation membrane 1012 to the receiving DMF device surface with the actuation electrodes (e.g. the surface of the bottom plate) by gravity and capillary forces of the receiving DMF surface. In some embodiments, negative and/or positive pressure can be used to drive the fluid through the membrane. For example, a negative pressure can be generated between the plates at the fluid outlet using a pump, such as a displacement pump, and/or a positive pressure can be generated at the fluid inlet using a pump. The pressure and enhanced flow rate can be maintained below a desired threshold to reduce or prevent hemolysis, which can interfere with some types of nucleic acid assays. In some embodiments, the base flow rate using a 2 cm diameter membrane without pressure enhancement is between about 50 to 200 microliters per minute (i.e., 50, 60, 70, 80, 90, 100, 110, or 120 microliters per minute). The flow rate can depend on the size and characteristics of the membrane (i.e., pore size and pore distribution) as well as the magnitude of the applied positive and/or negative pressure. In some embodiments, the enhanced flow rate through the membrane with pressure enhancement can be less than 10, 20, 30, 40, 50, 60, 70, 80, 90, or 100% more than the base flow rate through the membrane without pressure enhancement. The positive and/or negative pressure used to enhance the flow rate can be set or modulated to achieve the above flow rates.

Once the plasma contacts the DMF surface with the actuation electrodes 1010, the actuation electrodes contacting the plasma and around the contact point are activated, thereby pulling the plasma towards the DMF surface using electrowetting forces, and then a volume between 10-250 μL (e.g., ~70 μL) of the extracted plasma is actuated by actuation electrodes of the DMF device 1000 for further processing. In some embodiments, a sensor can be used for feedback control by detecting when the plasma contacts the bottom plate, and the actuation electrodes can be activated when the sensors detect the plasma on the plate. For example, the actuation electrodes and/or separate sensor electrodes can be used to measure capacitance, which changes when liquid covers the electrode. In some embodiments, the actuation electrodes 1012 below the sample outlet 1004 can be activated before the extracted plasma contacts the actuation electrodes and can be kept on until a sufficient amount of plasma has been extracted or can be kept on for a set or predetermined amount of time, such as about 1, 2, 3, 4, or 5 minutes. As mentioned above, one of the key features of the assembled architecture is the super hydrophobic environment surrounding the separation membrane 1012 which prevents or reduces the likelihood that blood sample overflows from the edge of the separation membrane and into the gap between the cover plate and top plate, which allows the DMF device to achieve a maximum or increased volume of plasma flow through the separation membrane. The systems and methods described herein result in extraction yields up to 2× the volume of plasma extraction from a given sample volume in comparison to benchtop lateral flow methods. Moreover, the quality of plasma collected using this DMF device is surprisingly comparable to plasma prepared by centrifugation and lateral-flow methods with respect to the degree of RBC hemolysis. The system is designed for facile reconfiguration and reprogramming, for accommodation of a wide range of blood volumes and plasma output.

Example 1: Device Fabrication and Assembly

DMF apparatuses that include embedded centrifuge tubes and/or well-plate wells (e.g., FIGS. 2B, 2C) were constructed by drilling 5.5 mm diameter holes into 3 mm thick PCB substrates, bearing copper (43 μm thick) plated with nickel (185 μm) and gold (3.6 μm) for electrodes and conductive traces. Tubes and wells were then inserted into holes. DMF devices with embedded wells (e.g., FIG. 2D) were fabricated with holes (5 mm diameter, 10 mm depth) drilled in 15 mm thick PCB substrates. Actuation electrodes (each 10 mm×10 mm) were formed by conventional photolithography and etching, and were coated with soldermask (~15 μm) as the dielectric. As shown in FIGS. 3A-3E, some of the electrodes were formed around and adjacent to the hole which served as the access point to reaction compartments. The electrical contact pads were masked with polyimide tape (DuPont; Hayward, CA), and the substrate was spin-coated with a 50 nm layer of Teflon-AF (1% wt/wt in Fluorinert FC-40, 1500 rpm for 30 sec) and then baked at 100° C. for 3 h. The top plate of the DMF device, consisting of a glass substrate coated uniformly with unpatterned indium tin oxide (ITO) (Delta Technologies Ltd; Stillwater, MN) with 5.5 mm diameter PDMS plugs was spin-coated with 50 nm of Teflon-AF, as described above.

Prototype devices fabricated as described above performed better or as well as air-gap DMF apparatuses without reaction chambers.

Example 2: Quantifying Evaporation Prevention Using Waxes

Figure 5:
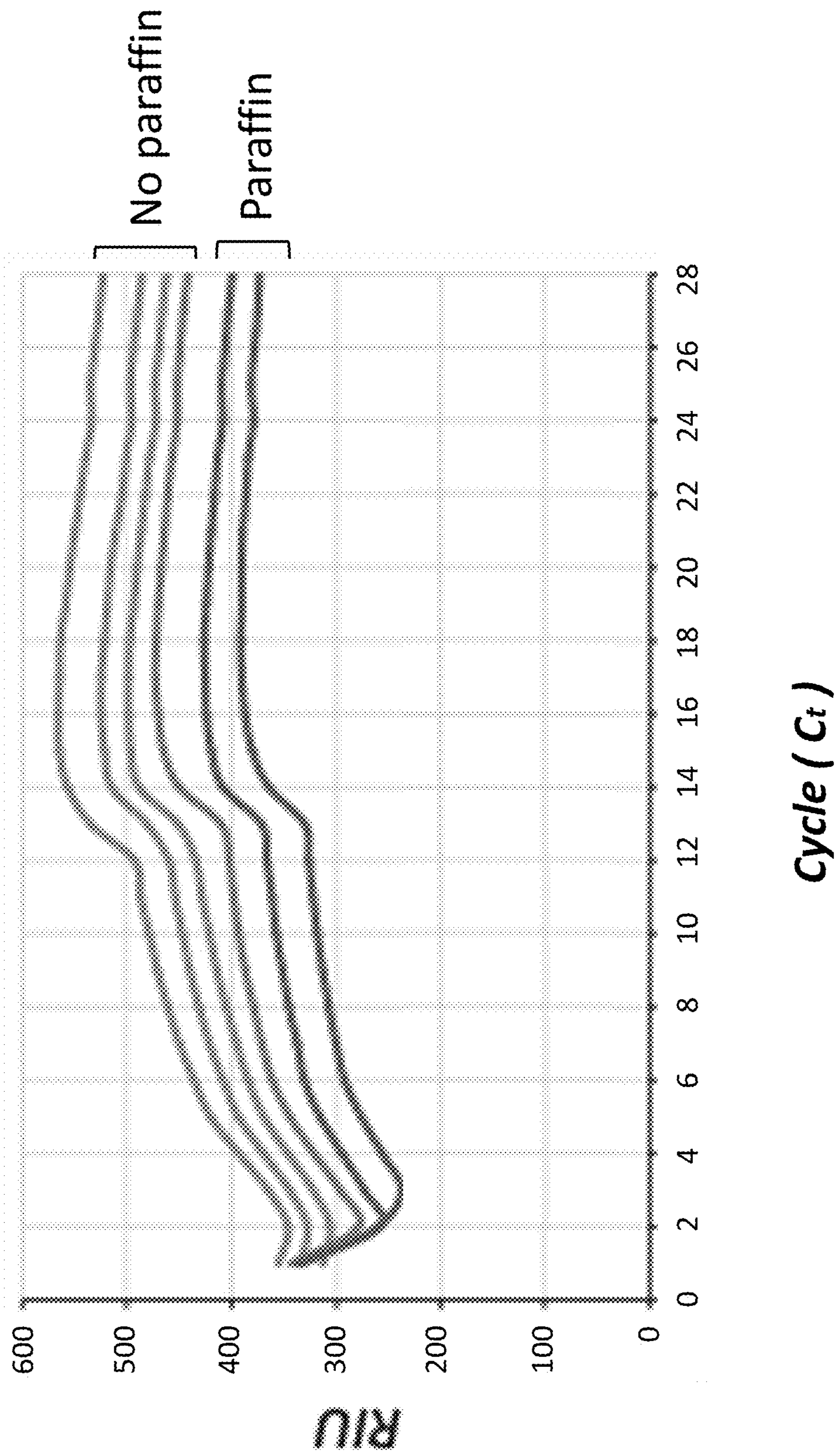
FIG. 5 is a graph comparing an amplification reaction by LAMP with and without a wax covering as described herein, protecting the reaction droplet from evaporation.
Figure 6A:
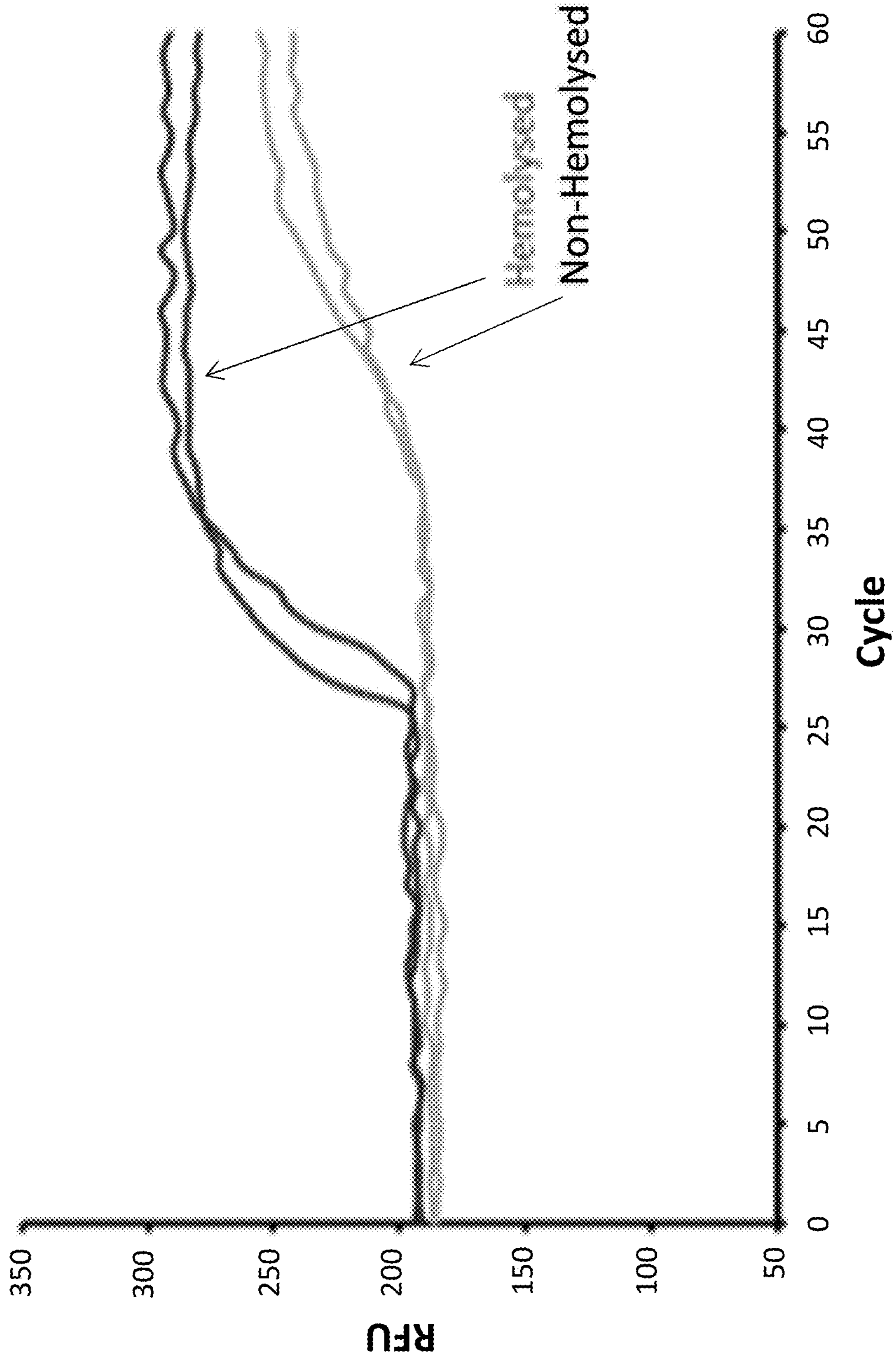
FIG. 6A show graphical results of LAMP using paraffin-mediated methods; this may be qualitatively compared to the graph of FIG. 6B shows graphical results of LAMP using conventional methods.
Figure 6B:
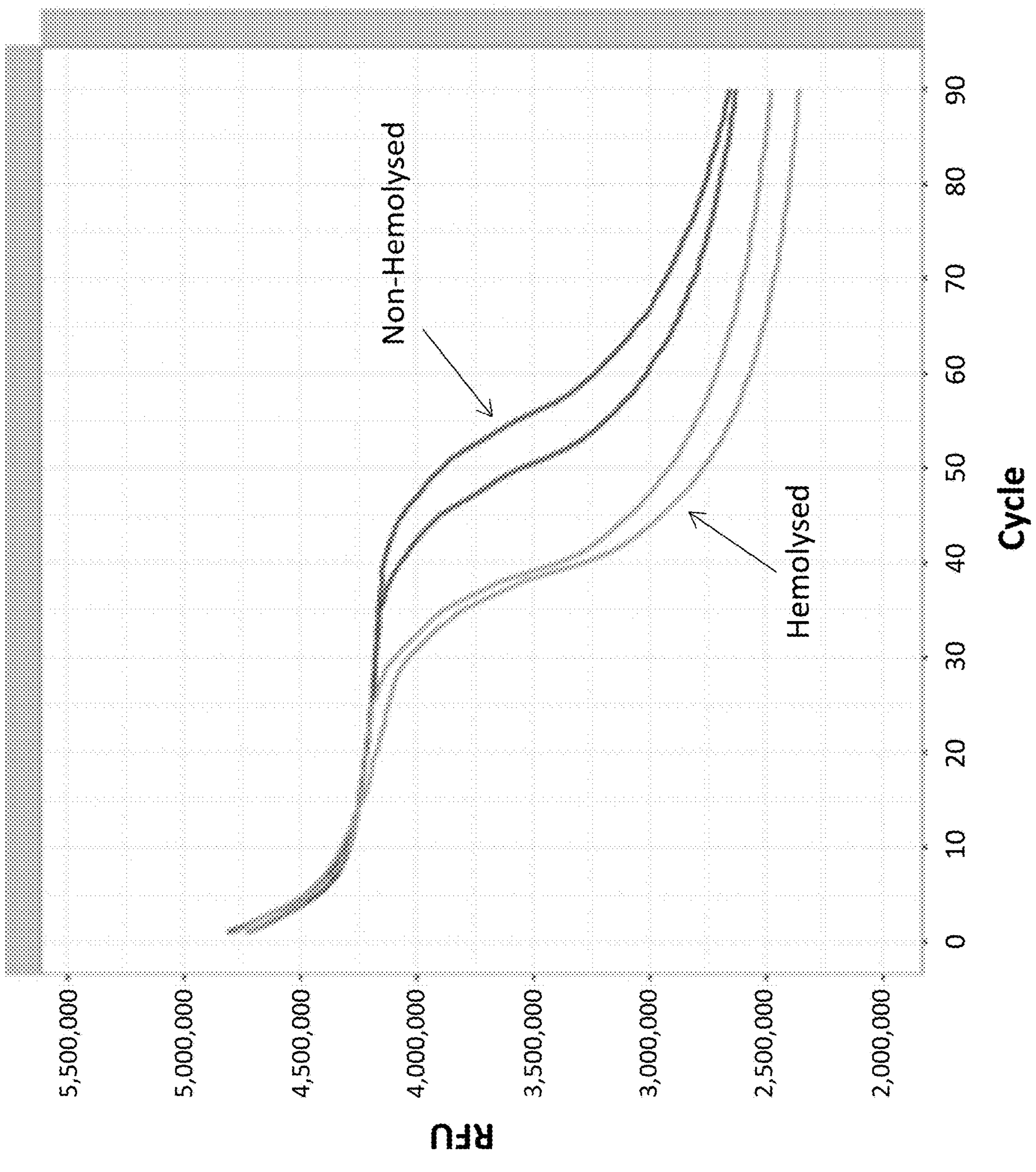

To qualitatively evaluate the effect of wax bodies to prevent evaporation in our assays, loop mediated amplification (LAMP) reactions were executed while covered in liquid paraffin wax in tubes on the benchtop using a real-time PCR Machine. As shown in FIG. 5, the LAMP assay amplified miR-451, and the Ct values with and without paraffin were comparable (~13 cycles), indicating no significant effect on the assay. For LAMP on DMF, the reaction droplet (8 μL) was driven to heating zone (as shown in FIG. 4A). There, the droplet wets the solid paraffin wax wall which under conditional heating at 63° C. will melt into liquid wax to encircle the reaction volume and maintain it intact throughout the incubation time at 63° C. FIG. 6A shows a LAMP assay using paraffin-mediated methods, while FIG. 6B shows a LAMP assay using conventional methods. In FIG. 6A, the two upper traces are for a hemolyzed sampled while the two lower traces are for a non-hemolyzed sample. The two traces of each are to show repeatability of the runs using wax-mediated air matrix DMF. In FIG. 6B, the conventional LAMP assay for a hemolyzed sample are shown in upper two traces while the non-hemolyzed LAMP runs are shown in lower two traces. Again, the two upper and two lower traces each are to show result repeatability. The wax-mediated approach on DMF generated results comparable in Ct values to those generated by conventional LAMP in tubes as shown in FIGS. 6A and 6B.

Example 3: miRNA Purification

Human Panel A beads from the TaqMan® miRNA ABC Purification Kit (Thermo Fisher Scientific). Aliquots of miRNA (4 ul), or "reaction droplets", were loaded onto the DMF platform and brought to an array of electrodes overlaying the heating zone such that the droplet came into contact with the paraffin wall. The heating zone was then heated (65° C., 2 min) to melt the paraffin around the droplet. Once the paraffin melted, the reaction droplets were driven away from the heating zone and merged with miRNA Binding Beads (4×106 beads; FIG. 3A) in 2 ul of mineral oil (i.e., carrier droplet). After mixing, the droplets were incubated (30° C., 30 min) to allow miRNA to bind to the miRNA Binding Beads. Beads were captured by engaging an external magnet positioned below the bottom plate. Once a pellet was formed, the beads were recovered from solution by moving the magnet laterally along the bottom plate while simultaneously actuating the electrodes positioned below the reaction droplet (FIG. 3B). The miRNA Binding Beads were then resuspended in water (4 ul) using the DMF platform and transferred to a centrifuge tube for elution of miRNA (70° C., 3 min; FIG. 3C). The efficiency of miRNA recovery from paraffin-encased miRNA droplets was evaluated against recovery from miRNA droplets without paraffin, but only in oil. RT-qPCR analysis of miRNA prepared by the system from samples with and without paraffin encasement generated comparable Ct values.

Example 4: Plasma Separation Device

Cover plates bearing 4 mm ID hole were spray-coated on both sides with a super-hydrophobic layer (~500 nm, NeverWet®) followed by post-baking in an oven (100° C., 10 min). Device top plates with 10 mm ID holes were coated with a super-hydrophobic layer (as above) on one side and the side comprising of ground electrode was spin-coated with a hydrophobic layer (50 nm, Teflon-AF1600) followed by post-baking as above. The bottom plate of the DMF device was designed in CAD systems, and Gerber files were outsourced to a third-party company for fabrication. Briefly, a six-layer PCB substrate bearing copper electrodes (43 μm thick) plated with nickel (185 μm) and gold (3.6 μm) were formed by conventional photolithography and etching 15, and covered with dielectric tape (25 μm). The substrate featured an array of one-hundred and twenty actuation electrodes (each 3.5×3.5 mm) with inter-electrode gaps of 40 μm. The cover and top plates were assembled by means of screws with the plasma separation membrane (PALL, Ann Arbor, MI) sandwiched in between. The bottom and top plates were assembled with a spacer consisting of three pieces of double-sided tape (total thickness of ~300 μm).

A sample of whole blood (300 μL) was spotted directly onto a prewetted (with tris buffer) separation membrane. The sample was incubated for 3 minutes and during that time plasma transferred from the bottom of the separation membrane to the receiving DMF device surface by capillary forces of the receiving DMF surface. Once the plasma contacted the DMF surface, the actuation electrodes were activated, thereby pulling the plasma towards the DMF surface using electrowetting forces. Once a sufficient volume of plasma was collected (~70 μL), the actuation electrodes were actuated by the DMF device for further processing of the collected plasma droplet.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An air-matrix microfluidic apparatus configured to process whole blood and manipulate plasma extracted from the whole blood, the apparatus comprising:

a first layer having a first hydrophobic surface;

a second layer having a second hydrophobic surface, the second layer having a sample outlet;

an air gap formed between the first and second layers;

a sample inlet positioned over the sample outlet, the sample inlet configured to receive a sample of whole blood;

a plasma separation membrane positioned between the sample inlet and the sample outlet, the plasma separation membrane configured to extract plasma into the sample outlet from the whole blood in the sample inlet; and a controller programmed to drive an actuator to draw the plasma through the plasma separation membrane when the plasma extracted from the whole blood contacts the first layer.

2. The apparatus of claim 1, wherein the sample inlet has a super-hydrophobic surface.

3. The apparatus of claim 2, wherein the second layer has a second side with a super-hydrophobic surface, wherein the plasma separation membrane is positioned between the super-hydrophobic surface of the second layer and the super-hydrophobic surface of the sample inlet.

4. The apparatus of claim 1, wherein the controller is configured to drive the actuator by actuating one or more actuation electrodes to draw the plasma through the plasma separation membrane.

5. The apparatus of claim 1, wherein the sample inlet is positioned above the sample outlet such that when the sample of whole blood is placed in the sample inlet, gravity draws the plasma through the plasma separation membrane.

6. The apparatus of claim 1, wherein the plasma separation membrane is porous and has larger pores positioned towards the sample inlet and smaller pores positioned towards the sample outlet.

7. The apparatus of claim 6, wherein the plasma separation membrane is an assembly of a plurality of membranes having different pore sizes.

8. The apparatus of claim 1, wherein the sample outlet is larger than the sample inlet.

9. A method of extracting plasma from whole blood in an air gap of a microfluidic apparatus, the method comprising:
- prewetting a plasma separation membrane before introducing a sample of whole blood into a sample inlet of the microfluidic apparatus;
- introducing the sample of whole blood into the sample inlet;
- extracting plasma from the sample of whole blood in the sample inlet through a plasma separation membrane and into a sample outlet into the air gap of the microfluidic apparatus;
- transporting the extracted plasma from the sample outlet to a first region within the air gap of the microfluidic apparatus; and
- driving an actuator to extract plasma from the sample of whole blood by driving a droplet of the plasma within the air gap.

10. The method of claim 9, wherein the sample inlet is positioned above the sample outlet such that when the sample of whole blood is introduced into the sample inlet, gravity draws the plasma through the plasma separation membrane.

11. The method of claim 9, wherein the plasma separation membrane is sandwiched between a pair of super-hydrophobic surfaces.

12. The method of claim 9, wherein the extracted plasma is transported from the sample outlet to the first region at least in part by gravity.

13. The method of claim 9, further comprising detecting when the extracted plasma is within the first region of the air gap.

14. The method of claim 9, wherein driving the actuator comprises actuating one or more actuation electrodes to extract plasma from the sample of whole blood.

15. The method of claim 14, further comprising actuating the one or more actuation electrodes after the extracted plasma contacts the first region.

16. A method of extracting plasma from whole blood in an air gap of a microfluidic apparatus, the method comprising:
- introducing a sample of whole blood into a sample inlet of the microfluidic apparatus;
- extracting plasma from the sample of whole blood in the sample inlet through a plasma separation membrane and into a sample outlet of the microfluidic apparatus;
- transporting the extracted plasma from the sample outlet to a first region of the air gap of the microfluidic apparatus; and
- actuating a driver to transport a droplet of the extracted plasma from the first region of the air gap of the microfluidic apparatus to a second region of the air gap of the microfluidic apparatus to actively extract plasma from the sample of whole blood.

* * * * *